(12) United States Patent
Amaru et al.

(10) Patent No.: US 7,673,282 B2
(45) Date of Patent: Mar. 2, 2010

(54) ENTERPRISE INFORMATION UNIFICATION

(75) Inventors: Ruth M. Amaru, Gush Etzion (IL); David Cavenor, Jerusalem (IL); Joseph Edelstein, Jerusalem (IL); Benjamin Halberstadt, Jerusalem (IL); Ahuva Hazan-Fuchs, Ramat Beit-Shemesh (IL); Ziv Hellman, Jerusalem (IL); Joshua Fox, Emek Ha'ela (IL); Hayden Marchant, Ramat Beit-Shemesh (IL); Rannen Meir, Jerusalem (IL); Boris Melamed, Jerusalem (IL); Zvi Schreiber, Jerusalem (IL); Guy Yitzhaki, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 2231 days.

(21) Appl. No.: 10/302,370

(22) Filed: Nov. 22, 2002

(65) Prior Publication Data
US 2003/0177481 A1 Sep. 18, 2003

Related U.S. Application Data

(63) Continuation-in-part of application No. 10/159,516, filed on May 31, 2002, now abandoned, which is a continuation-in-part of application No. 10/104,785, filed on Mar. 22, 2002, now Pat. No. 7,146,399, which is a continuation-in-part of application No. 10/053,045, filed on Jan. 15, 2002, now abandoned, which is a continuation-in-part of application No. 09/904,457, filed on Jul. 6, 2001, now Pat. No. 7,093,200, which is a continuation-in-part of application No. 09/866,101, filed on May 25, 2001, now Pat. No. 7,099,885.

(51) Int. Cl.
*G06F 9/45* (2006.01)

(52) U.S. Cl. .................................... 717/104
(58) Field of Classification Search ................. 717/104
See application file for complete search history.

(56) References Cited

U.S. PATENT DOCUMENTS

| 5,499,371 A | 3/1996 | Henninger et al. |
| 6,374,252 B1 | 4/2002 | Althoff et al. |
| 6,591,272 B1 | 7/2003 | Williams |
| 6,643,633 B2 | 11/2003 | Chau et al. |
| 6,732,109 B2 | 5/2004 | Lindberg et al. |

(Continued)

OTHER PUBLICATIONS

Irani, Romin, "Enabling Web SErvices with BEA WebLogic" Sep. 26, 2001, pp. 1-4. http://www.webservicesarchitect.com/content/articles/irrani05.asp.

(Continued)

*Primary Examiner*—John Chavis
(74) *Attorney, Agent, or Firm*—Yee & Associates, P.C.; Elissa Y. Wang

(57) ABSTRACT

An enterprise information unification system including an information modeler for modeling business entities and their properties as an information model, the information model being comprised of business constructs, a data rationalizer for generating mappings from physical data assets to the information model, the physical data assets being comprised of data asset constructs, and a data thesaurus for automating tasks of data management based on the mappings. A method is also described and claimed.

102 Claims, 13 Drawing Sheets

U.S. PATENT DOCUMENTS

| | | | |
|---|---|---|---|
| 6,792,580 B2 * | 9/2004 | Kawakatsu | 716/3 |
| 6,847,974 B2 | 1/2005 | Wachtel | |
| 6,947,943 B2 | 9/2005 | DeAnna et al. | |
| 6,985,905 B2 | 1/2006 | Prompt et al. | |
| 7,007,029 B1 | 2/2006 | Chen | |
| 7,200,563 B1 * | 4/2007 | Hammitt et al. | 705/7 |
| 7,315,849 B2 * | 1/2008 | Bakalash et al. | 707/2 |
| 2002/0169842 A1 * | 11/2002 | Christensen et al. | 709/206 |
| 2003/0050932 A1 | 3/2003 | Pace et al. | |
| 2007/0038500 A1 * | 2/2007 | Hammitt et al. | 705/9 |

OTHER PUBLICATIONS

Klein et al., "The Relation between Ontologies and schema languages" Vrije Universiteit Amsterdam, http:www.cs.vu.nl/~mcaklein/papers/oil-xmls.pdf.

* cited by examiner

ENTERPRISE INFORMATION UNIFICATION

CROSS REFERENCES TO RELATED APPLICATIONS

This application is a continuation-in-part of assignee's application U.S. Ser. No. 10/159,516, filed on May 31, 2002, now abandoned entitled "Data Query and Location through a Central Ontology Model," which is a continuation-in-part of application U.S. Ser. No. 10/104,785, filed on Mar. 22, 2002, now U.S. Pat. No. 7,146,399 entitled "Run-Time Architecture for Enterprise Integration with Transformation Generation," which is a continuation-in-part of application U.S. Ser. No. 10/053,045, filed on Jan. 15, 2002, now abandoned entitled "Method and System for Deriving a Transformation by Referring Schema to a Central Model," which is a continuation-in-part of assignee's application U.S. Ser. No. 09/904,457 filed on Jul. 6, 2001, now U.S. Pat. No. 7,093,200 entitled "Instance Brower for Ontology," which is a continuation-in-part of assignee's application U.S. Ser. No. 09/866,101 filed on May 25, 2001, now U.S. Pat. No. 7,099,885 entitled "Method and System for Collaborative Ontology Modeling."

FIELD OF THE INVENTION

The present invention relates to enterprise information unification and collaborative enterprise data modeling.

BACKGROUND OF THE INVENTION

One of the difficult challenges faced by enterprise information technology is that of managing diversity. Data sources for large enterprises can be substantially different from one another, and are often comprehensible only by special purpose application programs. Sales data, accounting data, inventory data, purchasing data, human resources data—all of these data sources inter-relate to some extent, but cross-data processing requires much manual effort and development of special purpose adaptors to bridge each pair of data sources.

Moreover diverse data sources typically use diverse data structures, including for example COBOL record systems, relational database systems, XML document systems, and in many cases custom proprietary data schema.

Making the challenge of managing diversity even more difficult, individual data sources typically have their own lexicon for business entities. For example, purchasing data may be keyed on an enterprise's SKU classification, sales data may be keyed on model numbers, and payroll data may be keyed on social security and income tax based systems. For an accounting program to determine profit based on sales revenue vs. cost of goods and cost of labor, it is necessary to bridge the three lexicons.

The older the enterprise, and the larger the enterprise, the more diversity likely exists among its data sources. How does such diversity arise? Some of it arises by legacy—electronic data processing systems have been around for well over fifty years, and as computer technology advances new systems supplant older ones. Some of it arises by growth, through mergers and acquisitions. Some of it arises by use of proprietary data processing systems, perhaps for reasons of security or customization.

There is thus a pressing need for enterprise information integration solutions.

A general reference on database systems is Garcia-Molina, H., Ullman, J. D. and Widom, J., "Database Systems: The Complete Book," Prentice-Hall, Upper Saddle River, N.J., 2002.

Another challenge that arises in modeling enterprise data is collaboration. In the past, development of a data schema such as a relational database schema or an XML schema was generally performed by a single person. Today, with enterprise data models becoming ever more complex and with networked computer architectures prevalent, effective collaborative data modeling is a challenge. Among the problems to be overcome, evolution and versioning are prominent.

A recent development in collaborative data modeling is the recent Semantic Web initiative for semantic management of data. The Semantic Web represents a new trend—managing information, rather than managing data. A general reference on the Semantic Web is Noy, N. F. and Klein, M., "Ontology Evolution: Not the Same as Schema evolution," available on the Internet at http://smi-web.stanford.edu/pubs/SMI_Abstracts/SMI-2002-0926.html.

SUMMARY OF THE INVENTION

The present invention provides a method and system for enterprise unification, which overcomes the problems of diversity among data sources. Using the present invention, a central information model with a single business-oriented data structure and a single business-oriented lexicon is generated; and the diverse data structures, referred to as physical data assets, for the diverse enterprise data sources, are mapped into the central model—a processed referred to as rationalization. Enterprise information is thus unified—not by moving or transforming all of the physical data assets into a single data source, but rather by keeping the physical data assets intact and mapping them into the central model.

As such, the present invention serves as a unified data thesaurus, translating diverse schema and data lexicons into a common data model and lexicon, respectively. This feature of the present invention enables enterprises to visualize the totality of their data sources, thereby understanding "what's out there." Using the present invention, enterprises can identify data overlap, data inconsistency and missing data, and perform effective data cleansing.

In addition to unifying diverse data sources, the present invention enables enterprises to perform cross-data processing tasks by translating data processing instructions from the common lexicon of the central information model to data processing instructions for each of the diverse physical data asset lexicons. For example, an enterprise can use the present invention to generate queries for its physical data sources from a central query about the central information model. Integration across the diverse physical data assets is thus made transparent—as if all of the enterprise data actually resided in a single data source conforming to the central information model.

The present invention provides a unified navigator for interactively viewing a multiplicity of business concepts, including the central information model, the physical data assets, mappings, queries and transformations relating to the physical data assets, and instances of the information model and the physical data assets.

The present invention includes a distributed method and system, whereby many users can collaborate on modeling enterprise data via the central information model and the mappings of the physical data assets thereto. The present invention controls concurrency among users by enforcing a locking mechanism, whereby a user must obtain a lock on a portion of the central model in order to modify it, and other users cannot obtain such lock until the user having the lock releases the lock.

There is thus provided in accordance with a preferred embodiment of the present invention an enterprise information unification system including an information modeler for modeling business entities and their properties as an information model, the information model being comprised of business constructs, a data rationalizer for generating mappings from physical data assets to the information model, the physical data assets being comprised of data asset constructs, and a data thesaurus for automating tasks of data management based on the mappings.

There is additionally provided in accordance with a preferred embodiment of the present invention a method for enterprise information unification including modeling business entities and their properties as an information model comprised of business constructs, generating mappings from physical data assets to the information model, the physical data assets being comprised of data asset constructs, and automating tasks of data management based on the mappings.

There is further provided in accordance with a preferred embodiment of the present invention an enterprise information unification system including a memory for storing an information model that models business entities and their properties, and for storing mappings from physical data assets to the information model, and a data thesaurus for translating business instructions for the information model into corresponding data processing instructions for the physical data assets, based on the mappings.

There is yet further provided in accordance with a preferred embodiment of the present invention a method for enterprise information unification including providing an information model that models business entities and their properties, providing mappings from physical data assets to the information model, and translating business instructions for the information model into corresponding data processing instructions for the physical data assets, based on the mappings.

There is moreover provided in accordance with a preferred embodiment of the present invention an enterprise information unification system including a memory for storing an information model that models business entities and their properties, the information model being comprised of business constructs, and for storing mappings from physical data assets to the information model, and an impact analyzer for determining the impact of a candidate modification to the information model on the business constructs and the mappings.

There is additionally provided in accordance with a preferred embodiment of the present invention a method for enterprise information unification including providing an information model that models business entities and their properties, the information model being comprised of business constructs, providing mappings from physical data assets to the information model, and determining the impact of a candidate modification to the information model on the business constructs and the mappings.

There is further provided in accordance with a preferred embodiment of the present invention an enterprise information unification system including a memory storing an information model that models business entities and their properties, the information model being comprised of structured business constructs and business rules, and for storing mappings from physical data assets to the information model, and a rationalization validator validating that the physical data assets conform to the structure and business rules of the information model, based on the mappings.

There is yet further provided in accordance with a preferred embodiment of the present invention a method for enterprise information unification including providing an information model that models business entities and their properties, the information model being comprised of structured business constructs and business rules, providing mappings from physical data assets to the information model, and validating that the physical data assets conform to the structure and business rules of the information model, based on the mappings.

There is moreover provided in accordance with a preferred embodiment of the present invention an enterprise information unification system including a memory storing an information model that models business entities and their properties, and for storing mappings from physical data assets to the information model, and a consistency validator comparing physical data assets that have related data for consistency, based on the mappings.

There is additionally provided in accordance with a preferred embodiment of the present invention a method for enterprise information unification including providing an information model that models business entities and their properties, providing mappings from physical data assets to the information model, and comparing physical data assets that have related data for consistency, based on the mappings.

There is further provided in accordance with a preferred embodiment of the present invention an enterprise information unification system including a memory storing an information model that models business entities and their properties, and for storing mappings from physical data assets to the information model, and a data locator identifying physical data assets having overlapping data, based on the mappings.

There is yet further provided in accordance with a preferred embodiment of the present invention a method for enterprise information unification including providing an information model that models business entities and their properties, providing mappings from physical data assets to the information model, and identifying physical data assets having overlapping data, based on the mappings.

There is moreover provided in accordance with a preferred embodiment of the present invention an enterprise information unification system including a memory storing an information model that models business entities and their properties, and for storing mappings from a first and second version of a physical data asset to the information model, and a data migrator generating transformation scripts from the first version of the physical data asset to the second version, based on the mappings.

There is additionally provided in accordance with a preferred embodiment of the present invention a method for enterprise information unification including providing an information model that models business entities and their properties, providing mappings from a first and second version of a physical data asset to the information model, and generating transformation scripts from the first version of the physical data asset to the second version, based on the mappings.

There is further provided in accordance with a preferred embodiment of the present invention an enterprise information unification system including a memory storing an information model that models business entities and their properties, and for storing mappings from physical data assets to the information model, and a data thesaurus describing how to transform data from a first physical data asset to a second physical data asset, based on the mappings.

There is yet further provided in accordance with a preferred embodiment of the present invention a method for enterprise information unification including providing an information model that models business entities and their properties, providing mappings from physical data assets to the information model, and describing how to transform data from a first physical data asset to a second physical data asset, based on the mappings.

There is moreover provided in accordance with a preferred embodiment of the present invention a collaborative business data modeling system, including at least one central project manager for maintaining a central project, the central project being comprised of business constructs that can be in locked or unlocked states, including a central project editor for updating the central project based on received modification instructions, and a central lock manager for granting and releasing locks on business constructs, whereby such business constructs are put in a locked state when the locks are granted, and distributed local project builders for modeling business entities and their properties, each including a local instruction generator for generating modification instructions for the central project editor, and a local lock processor for requesting and releasing locks on the business constructs from the central lock manager, wherein the grant of a lock on a business construct to a local lock processor of a local project builder prevents local instruction generators of other local project builders from generating modification instructions for such business construct.

There is additionally provided in accordance with a preferred embodiment of the present invention a method for collaborative business data modeling, including maintaining a central project, the central project being comprised of business constructs that can be in locked or unlocked states, granting and releasing locks on business constructs of the central project, whereby such business constructs are put in a locked state when the locks are granted, generating modification instructions for the central project, requesting and releasing locks on the business constructs, wherein grant of the locks enable the generating modification instructions, and updating the central project based on the modification instructions.

There is further provided in accordance with a preferred embodiment of the present invention an enterprise information unification system including a concept organizer for centrally organizing a plurality of inter-related business concepts, the business concepts including (i) an information model, (ii) business assets, (iii) mappings, queries and transformations relating to the business assets, and (iv) instances of the information model and the business assets, and a concept navigator displaying information about the plurality of business concepts, in response to interactive user requests.

There is yet further provided in accordance with a preferred embodiment of the present invention a method for enterprise information unification including centrally organizing a plurality of inter-related business concepts, the business concepts including (i) an information model, (ii) business assets, (iii) mappings, queries and transformations relating to the business assets, and (iv) instances of the information model and the business assets, and displaying information about the plurality of business concepts, in response to interactive user requests.

There is moreover provided in accordance with a preferred embodiment of the present invention a collaborative business data modeling system, including at least one central project manager for maintaining a central project, the central project including packages that can be in locked or unlocked states, each package including business constructs, including a central lock manager for granting and releasing locks on packages, whereby such packages are put in a locked state when the locks are granted, and distributed local project builders for modeling business entities and their properties, each including a local project editor for modifying a local copy of a package of the central project, a project merger for merging a modified package of the central project with the central project, and a local lock processor for requesting and releasing locks on portions of the central project from said central lock manager, wherein the grant of a lock on a package of the central project to a local lock processor of a local project builder prevents local project editors of other local project builders from modifying such package.

There is additionally provided in accordance with a preferred embodiment of the present invention a collaborative business data modeling system, including at least one central project manager for maintaining a central project, the central project including packages that include business constructs, including a central project editor for updating the central project based on received modification instructions, and a project merger for merging an updated package of the central project with the central project, and distributed local project builders for modeling business entities and their properties, each comprising a local project editor for modifying a local copy of a package of the central project.

There is further provided in accordance with a preferred embodiment of the present invention a collaborative business data modeling system, including at least one central project manager for maintaining a central project, the central project including packages that can be in locked or unlocked states, each package including business constructs, including a project merger for merging an updated package of the central project with the central project, and a central lock manager for granting and releasing locks on packages, whereby such packages are put in a locked state when the locks are granted, and distributed local project builders for modeling business entities and their properties, each including a local project editor for modifying a local copy of a package of the central project, and a local lock processor for requesting and releasing locks on packages of the central project from said central lock manager, wherein the grant of a lock on a package of the central project to a local lock processor of a local project builder prevents local project editors of other local project builders from modifying such package.

There is yet further provided in accordance with a preferred embodiment of the present invention a method for collaborative business data modeling, including downloading a central project from a server computer, the central project including packages that include business constructs, requesting a check-out of a package of the central project from the server computer, receiving a latest version of the central project from the server computer, modifying the package of the central project, requesting a check-in of the modified package of the central project, further receiving a latest version of the central project from the server computer, merging the modified package of the central project with the latest version of the central project, and sending the merged central project to the server computer.

There is moreover provided in accordance with a preferred embodiment of the present invention a method for collaborative business data modeling, including maintaining a central project, the central project including packages that include business constructs, receiving a request from a client computer for check-out of a package of the central project, sending a latest version of the central project to the client computer, further receiving a request from the client computer for check-in of the package of the central project, further sending a latest version of the central project to the client computer, further receiving an updated version of the central project from the client computer, and designating the updated version of the central project as the latest version of the central project.

There is additionally provided in accordance with a preferred embodiment of the present invention a method for collaborative business data modeling, including viewing a central project stored on a server computer, the central project including packages that include business constructs, generating modification instructions for modifying a package of the central project, and sending the modification instructions to the server computer, for application to the package of the central project.

There is further provided in accordance with a preferred embodiment of the present invention a method for collaborative business data modeling, including maintaining a central project, the central project including packages that include business constructs, receiving modification instructions for a package of the central project from a client computer, and updating the package of the central project according to the modification instructions.

There is yet further provided in accordance with a preferred embodiment of the present invention a method for collaborative business data modeling, including viewing a central project, the central project being comprised of packages that include business constructs, requesting a check-out of a package of the central project from a server computer, receiving a latest version of the package of the central project from the server computer, modifying the package of the central project; and sending the modified package of the central project to the server computer.

There is moreover provided in accordance with a preferred embodiment of the present invention a method for collaborative business data modeling, including maintaining a central project, the central project including packages that include business constructs, receiving a request from a client computer for check-out of a package of the central project, sending a latest version of the requested package of the central project to the client computer, further receiving a modified package of the central project from the client computer, designating the modified package of the central project as the latest version of the package of the central project, merging the modified package of the central project with the central project, and designating the modified package of the central project as the latest version of the package of the central project.

The following definitions are employed throughout the specification and claims.

1. CONSTRUCTS—components of a project, such as relations and attributes of a relational database schema, complex types, elements and attributes of an XML schema, and classes and properties of an ontology model;

2. INFORMATION MODEL—a model for an enterprise's business entities and their properties, such as an ontology model and business rules;

3. PACKAGE—a portion of the constructs of a project, the constructs of a project are divided into separate packages;

4. PHYSICAL DATA ASSETS—schema for enterprise data sources, such as relational database schema and XML schema;

5. PROJECT—an information model together with its peripherals, including physical data assets, mappings of physical data assets into the information model, test instances, transformations, queries and metadata associated therewith; and 6. RATIONALIZATION—relating a physical data asset to an information model, typically through a mapping.

7. PRESENT INVENTION—this phrase means at least one exemplary embodiment which is described herein and does not mean that any of the claims are to be limited to that particular embodiment.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
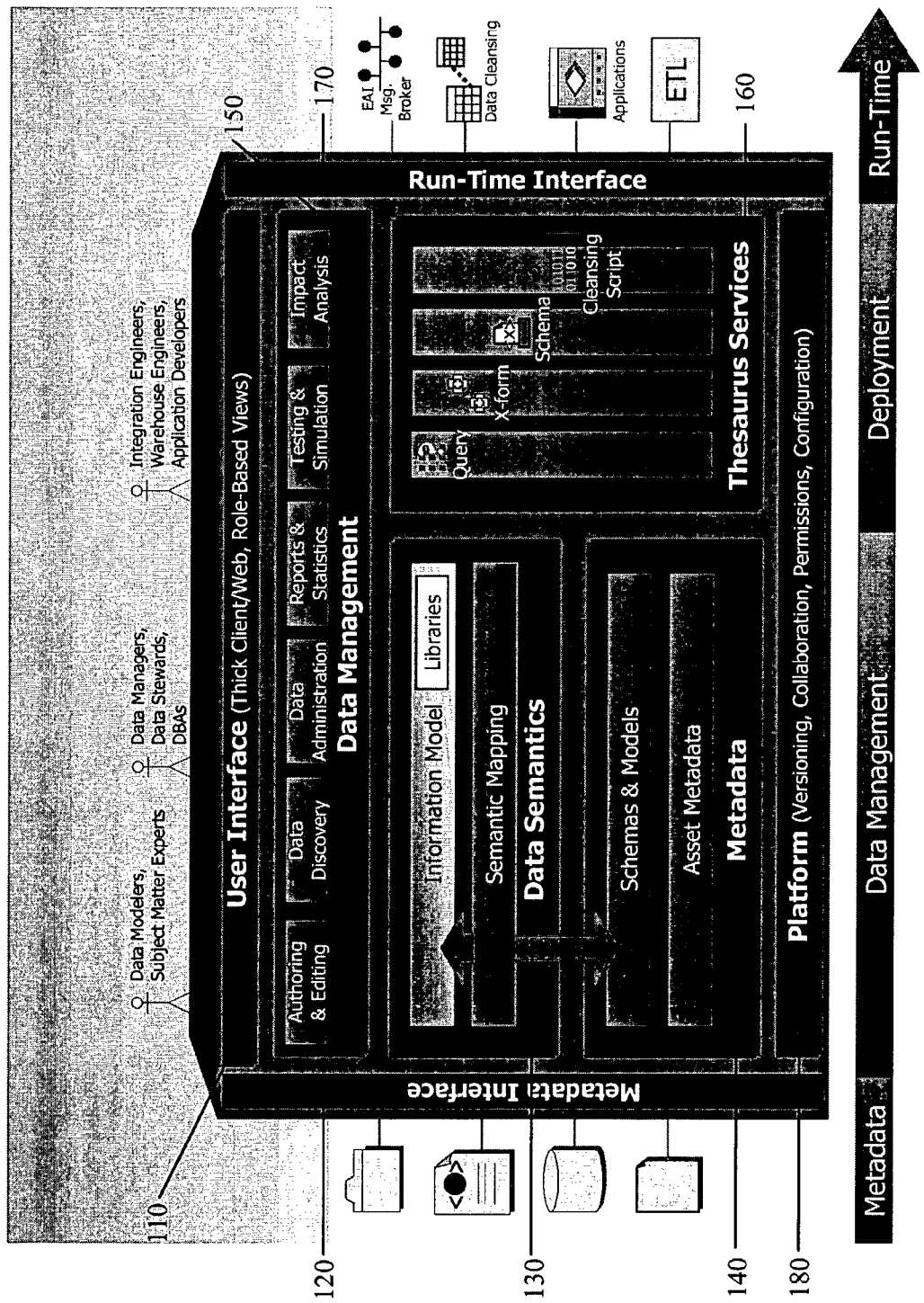
FIG. 1 is a high-level logical architecture diagram of an enterprise information unification system, in accordance with a preferred embodiment of the present invention.

The present invention concerns collaborative modeling of enterprise data and semantics therefor, and enterprise data unification. The present invention provides a method and system for generating a central information model that serves as a global central schema for an enterprise's business entities and their properties. The central information model is based on a central lexicon that crosses many diverse business units, such as sales, purchasing, manufacturing and accounting.

Schemas for physical data sources of the enterprise are rationalized within the central information model by mapping them into the central model. Such mappings identify constructs of the central model that correspond to constructs of the mapped schemas. Such mappings are used for translating between lexicons of the physical data assets and the lexicon of the central information model, and for providing thesaurus services.

The present invention uses the central information model and the mappings to provide a unified navigator for interactively viewing a multiplicity of business concepts, including the central information model and its constructs, the physical data assets and their constructs, mappings, queries and transformations relating to the physical data assets, and instances of the central information model and the physical data assets.

The present invention enables automation of data processing tasks across the physical data sources by translating instructions phrased in the central lexicon into equivalent instructions paraphrased in the lexicons of the physical data assets. When an enterprise application executes the translated instructions transparently, it appears to the user as if all of the enterprise data is located in a single central data source conforming to the central information model. Using the present invention, tasks such as data query, data migration, data transformation, data cleansing and data location, across multiple inter-related data sources, are performed through the single central information model and its lexicon.

The present invention also provides a method and system for collaborative generation of the central information model, over a distributed computing environment. Through use of version control and locking mechanisms, the present invention enables multiple users to work concurrently on the central model.

The present invention includes two general client-side architectures for collaboration. The first architecture, referred to as a "thin client" is designed for remote users to work directly on the central information model residing on a server computer. The thin client preferably operates through a standard web browser on a "client" computer system, and most of the application logic is performed on the server computer system. The second architecture, referred to as a "thick client" is designed for remote users to work on their own local copies of the central information model. The thick client performs most of the application logic. A computer system is generally any system (e.g. general purpose desktop computer, or hand-held computer or PDA (personal digital assistant) or cell phone (e.g. web enabled cell phone)) which includes a processor and memory which store software instructions which can be executed by the processor. In the case of a client system, a computer system may include a "dumb" terminal which can display data and receive user input. See U.S. Pat. No. 6,222,549 for examples of computer systems and networks. It will be appreciated that the information models and mappings and other data structures or instructions may be stored in physical memory (e.g. RAM or non-volatile storage) in such computer systems.

The present invention enables an enterprise to know where its data is, understand what its data means, and unify its data sources into a coherent asset. Reference is now made to FIG. 1, which is a high-level logical architecture diagram of an enterprise information unification system, in accordance with a preferred embodiment of the present invention. As shown at the top of FIG. 1, enterprise information unification preferably involves three types of activities. The first activity is data modeling; i.e., development of an information model for enterprise data encompassing the enterprise business entities and their properties. The second activity is data management; i.e., management of enterprise data, similar to database administration. The third activity is data deployment; i.e., using the enterprise data for analysis and forecasting.

The diagram in FIG. 1 includes the following seven main components: a user interface 110, a metadata interface 120, a data semantics module 130, a metadata module 140, a data management module 150, a thesaurus module 160, a run-time interface 170 and a platform 180. User interface 110 is preferably used to provide thick and thin web clients with role-based views specialized to integration engineers, database administrators, application developers, data managers and business users. User interface 110 preferably enables publication of the central information model and the overall enterprise information as linked HTML documents.

Metadata interface 120 serves as an interface for importing schemas and metadata of physical data assets, and for keeping the metadata inside the EIU environment synchronized with the physical data assets are changes occur over time. Preferably, metadata interface 120 also functions to import and reuse existing data models that are incorporated into the central information model.

Data semantics module 130 preferably includes a central information model for the enterprise, and semantic mappings that map physical data assets into the central information model. It may be appreciated by those skilled in the art that use of semantic mappings from physical data assets into the central information model obviates the need to maintain point-to-point mappings between each pair of physical data assets. New and changed data sources need only be mapped once to the central information model. Data semantics module 130 enables the enterprise to make its data unambiguous with explicit semantics. Data semantics module 130 serves to capture the precise and agreed-upon meaning of data in business terms, referred to as rationalization.

Metadata module 140 preferably stores data about the physical data assets, and enables the enterprise to centrally catalog its data assets and message formats.

Data management module 150 preferably includes sub-modules for authoring and editing, for data discovery, for data administration, for reports and statistics, for testing and simulation and for impact analysis, as described hereinbelow. Thesaurus module 160 preferably includes sub-modules for query generation, transformation generation, schema generation and data cleansing scripts. Schema generation refers to generation of a schema from an information model. Data cleansing refers to various operations designed to eliminate inconsistencies between overlapping data sources, decommission outdated data sources, and eliminate data redundancies and unwanted data. As such, thesaurus module 160 is preferably used to automate development of data translation scripts, queries, data cleansing scripts and schemas. Together, data management module 150 and thesaurus module 160 enable the enterprise to:

automatically generate accurate data transformations and queries;
    maintain accurate transformations and queries over time;
    identify overlapping data sources;
    make overlapping databases consistent;
    automatically generate data cleansing scripts;
    support the decommissioning of physical data assets;
    identify data sources related to specified business entities;
    analyze changes in the information model, mappings and physical data assets; and
    generate test instances for demonstrating and validating an information model and its business rules.

Platform 180 preferably includes the infrastructure necessary for versioning, collaboration, security and configuration.

Platform 180 enables multiple users to use the present invention collaboratively within a secure environment, with access and version control.

Figure 2:
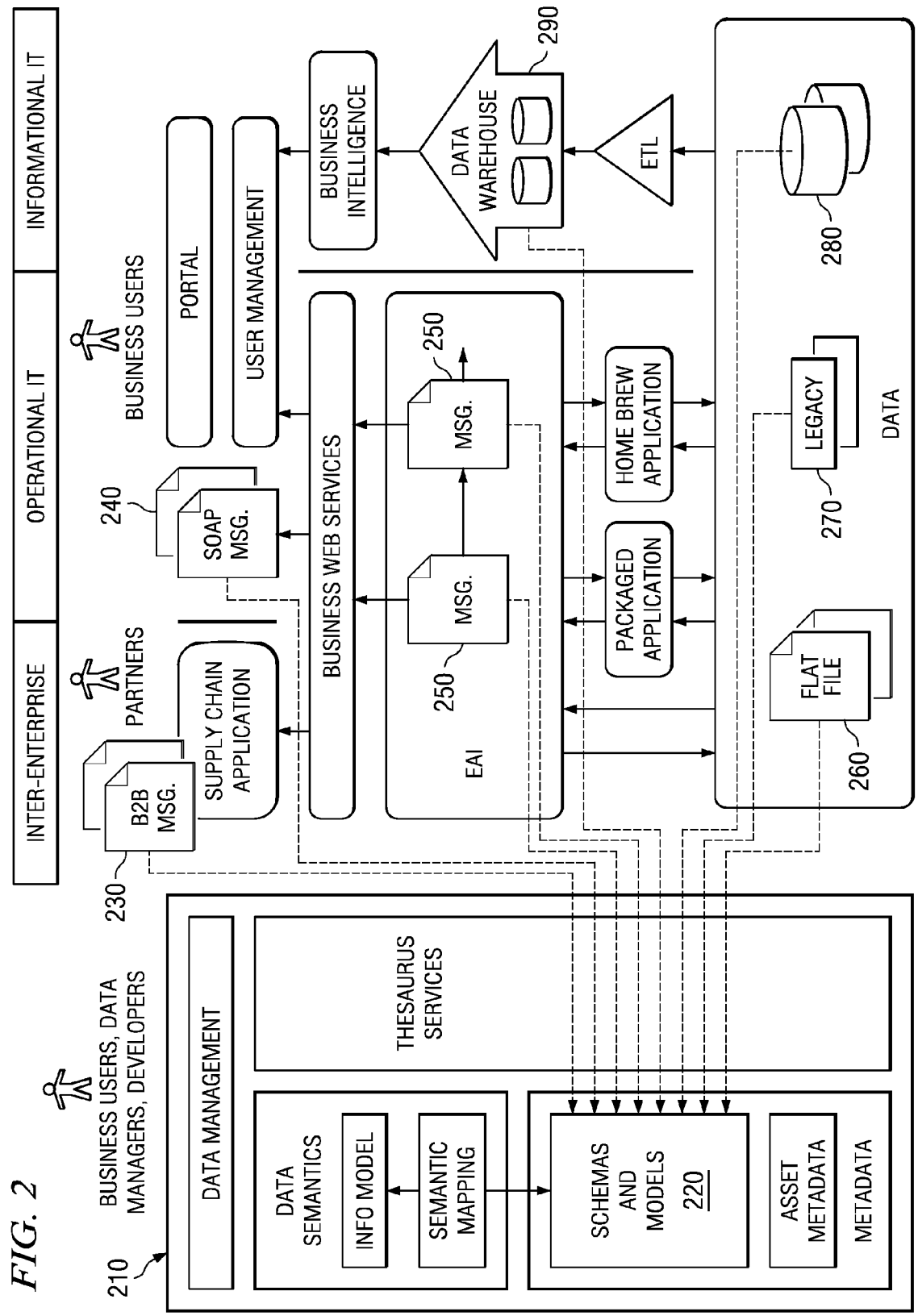
FIG. 2 is a high-level diagram of an enterprise information technology (IT) architecture, in accordance with a preferred embodiment of the present invention.

Reference is now made to FIG. 2, which is a high-level diagram of an enterprise information technology (IT) architecture, in accordance with a preferred embodiment of the present invention. Within enterprise information technology there are typically many diverse schemas for storing and transmitting data. Storage of schemas is indicated at the bottom of FIG. 2, and transmission of schemas is indicated in the middle of FIG. 2.

Using the present invention, formal semantics can be captured for each schema by mapping to a central information model. Enterprise data is often transformed. Using the present invention, data transformations, as indicated by arrows in FIG. 2, can be inferred based on understanding of the semantics, and such transformations can be maintained accurately and automatically.

It is noted that FIG. 2 is divided into information and operational modules, a user interface, and business-to-business applications.

Shown in FIG. 2 is an enterprise information unification system 210 including modules for data semantics, metadata, data management and thesaurus services as in FIG. 1. Scripts auto-generated by enterprise unification system 210 are preferably deployed by relational database management systems (RDMS), enterprise application integration (EAI) systems, and extract, transform and load (ETL) systems for use at run-time.

A central information model 220 within enterprise information unification system 210 preferably provides semantics for messages, and enables the various enterprise databases and message formats to interoperate. For example, central information model 220 is used to generate and maintain translation scripts necessary for business-to-business messages 230 within a supply chain application, SOAP messages 240, and messages 250 within an enterprise application integration system, to interoperate.

Central information model 220 preferably also provides semantics for data stores, including flat files 260, legacy data 270 and relational databases 280 within the enterprise. Central information model 220 as also preferably used by a data warehouse 290.

It may thus be appreciated from FIG. 2 that the present invention:

provides data models that serve as the foundation for business process modeling and management;

provides the data translation services required by enterprise application integration (EAI) tools and by extract transform and load (ETL) tools;

enables a semantically accurate dictionary for the interoperability of web services; and provides a common model for aggregating information in corporate portals.

Figure 3:
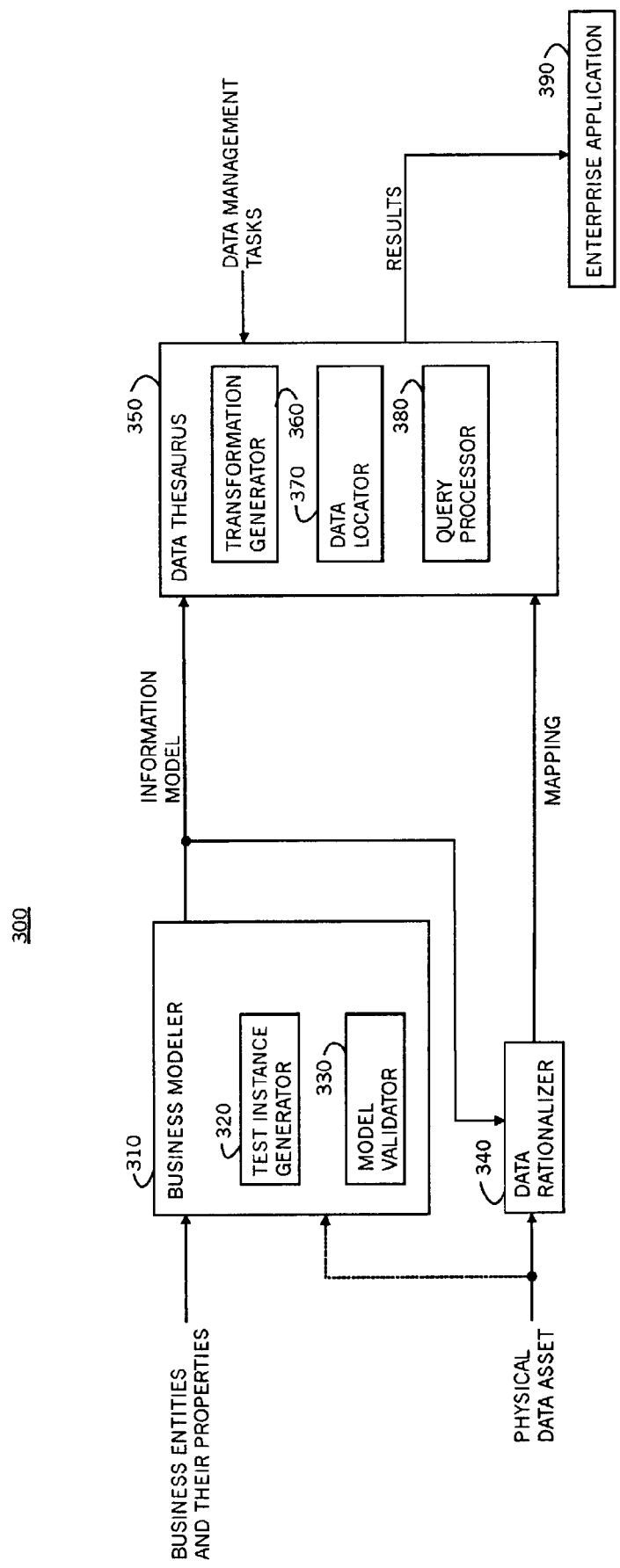
FIG. 3 is a simplified block diagram of an enterprise information unification system in accordance with a preferred embodiment of the present invention.

Reference is now made to FIG. 3, which is a simplified block diagram of an enterprise information unification system 300 in accordance with a preferred embodiment of the present invention. Shown in FIG. 3 is a business modeler 310, used by an enterprise for generating an information model that encapsulates the enterprise's business entities and their properties. Preferably, the information model generated by business modeler 310 is akin to a schema in that it does not include actual business data, but rather serves as a template or skeleton to govern a data structure.

In a preferred embodiment of the present invention, the information model generated by business modeler 310 is an ontology model, whose constructs include classes, properties, inheritance relationships and business rules, as described in detail hereinbelow.

Business modeler 310 includes a test instance generator 320, for generating instances of the information model. As pointed out hereinabove, the information model is akin to a schema, and the test instances are likewise akin to actual data that is structured accordingly. Preferably test instance generator 320 populates data that can be used to simulate actual enterprise data, as described in detail hereinbelow.

Business modeler 310 also includes a model validator 330, for validating an information model. Preferably model validator 330 checks test instance data for correctness and consistency vis a vis constraints of the information model including inter alia data typing and business rules, as described in detail hereinbelow.

Also shown in FIG. 3 is a data rationalizer 340, used by an enterprise for generating mappings from physical data assets into the information model. Physical data assets are preferably schema for data sources, and may include inter alia relational database schema, XML schema and COBOL copy books. The mappings generated by data rationalizer 340 associate to constructs of the physical data assets corresponding constructs within the information model, as described in detail hereinbelow.

As indicated in FIG. 3 by a dashed arrow, the physical data assets may optionally be used as inputs to business modeler 310, thus ensuring that the generated information model includes constructs corresponding to the constructs within the external data assets. In this way the information model may be "reverse engineered;" i.e., inferred from the structures of the physical data assets.

Also shown in FIG. 3 is a data thesaurus 350, used by an enterprise for automating tasks of data management. Preferably data thesaurus 350 uses the mappings generated by data rationalizer 340 to translate business instructions for the information model into corresponding data processing instructions for the physical data assets.

Data thesaurus is preferably used inter alia for translating messages between applications or between enterprises, for comparing databases for consistency, and for migrating data between versions of a database.

Data thesaurus 350 includes a transformation generator 360, for generating transformations used to carry out various data processing tasks. Preferably, transformation generator 360 generates queries and/or transformations for the physical data assets, including inter alia SQL and Xquery queries, and XSLT transformations. Such queries and/or transformations may be used, for example, to transform data among physical data assets or to populate physical data assets with data, as described in detail hereinbelow.

Data thesaurus 350 also includes a data locator 370, for locating sources of data among physical data assets related to prescribed constructs in the information model. Preferably, data locator 370 identifies constructs of physical data assets that hold information in one form or another about the prescribed constructs, as described in detail hereinbelow.

Data thesaurus 350 also includes a query processor 380, for converting queries for the information model into corresponding queries for one or more physical data assets. For example, query processor 380 may convert a query for the information model into an SQL query for a relational database and an Xquery for an XML database, as described in detail hereinbelow.

In a preferred embodiment of the present invention, results of data thesaurus 350, including inter alia queries and/or transformations generated by transformation generator 360, are passed to one or more enterprise applications 390 for execution. Specifically, an SQL query is preferably embedded within in an enterprise application or used in extract, transform and load (ETL), to transform data when loading a data warehouse. Alternatively, an SQL query is executed directly on a relational database management system for migrating, moving or comparing data. When the SQL query crosses multiple databases, it is preferably run on a query engine, or a virtual warehouse referred to as enterprise information integration (EII). In a preferred embodiment of the present invention, XSLT is used, instead of SQL, with a transformation engine or for enterprise application integration (EAI).

Business Modeler 310

Business modeler 310 is used to generate an information model incorporating business entities and their properties. In a preferred embodiment of the present invention, the information model is an ontology model.

Briefly, an ontology model provides a way to model things that exist. Basic constructs of an ontology model are classes, properties thereof, inheritance and business rules. Classes are sets, the elements of which are referred to as instances of the class. For example, a class People is a set of instances that represent specific people. A property, p, of a class is a function p: C→D from a class C, referred to as the source of p, to a class D, referred to as the target of p. The classes C and D may be the same class or different classes. When it is important to distinguish between properties defined on different classes, the longer notation C.p is also used to denote a property, p, defined on C. For example, a property People.age is used to designate a person's age.

Properties may be composed, so that if p: C→D and q: D→E, then the composition q∘p: C→E has source C and target E. The composition is also denoted by the longer notation C.p.q.

A class C is said to be a subclass of D if C⊆D, in which case D is also said to be a superclass of C. In this case, every instance of C is also an instance of D, and properties defined on D are also defined on C by inheritance. For example, a class named Passengers may be a subclass of a class named People. A property such as firstName, defined on People is inherited by Passengers.

A special class named Being is defined in an ontology model as a universal class that contains all classes as subclasses thereof. Properties defined on Being are thus inherited by all classes in the ontology model.

Certain properties, referred to as "representations," take on concrete fundamental alphanumeric values. The significance of representations is that they are properties one can reason about using arithmetic, logical and string operators, since their type corresponds to the types of mathematical expressions and programming language expressions.

In order to accommodate and provide values for representations, a special class Values is preferably created, so as to include all possible fundamental values a property may have. In addition, a special class Formats is also created, to include formats in which instances of Values can be expressed. Formats include inter alia conventional integer formats, real number formats, character string formats and date and time formats. A function representation: Values× Formats→Alphanumerics, converts a value into an alphanumeric string according to a specific format. For example, if lastName: People→Values, then representation(person.lastName, title Case)="Smith" (a character string), for an instance, person, of People corresponding to John Smith.

Observe that lastName is a representation, and titleCase is a format.

Alternatively, various formats can be modeled as properties on the class Values, or subclasses thereof. With respect to this alternative model design choice, the last name of John Smith represented as a character string in title case is denoted person.lastName.titleCase. Observe that lastName and titleCase are both representations in this alternative model.

Properties can be constrained to be unique; i.e., one-to-one. Unique properties can be used as identifiers for class instances.

Properties of an ontology class may be inter-related, and such relationships can be modeled using business rules. Business rules may specify inter alia that one property is an inverse of another, or that one property can be expressed in terms of other properties using a look-up table, formula or algorithm.

General ontology models can be represented by XML documents conforming to an XML schema for ontologies. A simplified version of such a schema is as follows.

```
<xs:complexType name="classType">
    <xs:attribute name="label" type="xsd:ID">
</xs:complexType>
<xs:complexType name = "classes">
    <xs:element name="class" type="classType"
        minOccurs="1" maxOccurs="unbounded" />
</xs:complexType>
<xs:complexType name="functionType">
    <xs:element name="source" type="xsd:IDREF" />
    <xs:element name="target" type=" xsd:IDREF" />
    <xs:attribute name="label" type="xsd:ID">
</xd:complexType>
<xs:complexType name="functions">
    <xs:element name="function" type="functionType"
        minOccurs="0" maxOccurs="unbounded" />
</xs:complexType>
</xs:complexType name="inheritanceType">
    <xs:element name="subclass" type=" xsd:IDREF" />
    <xs:element name="superclass" type=" xsd:IDREF" />
</xs:complexType>
<xs:complexType name="inheritances">
    <xs:element name="inheritance" type="inheritanceType"
        minOccurs="0" maxOccurs="unbounded" />
</xs:complexType>
```

It is apparent to those skilled in the art that other formats for describing schemas, such as DTD and schematron, may be used instead of XML schema.

Figure 4:
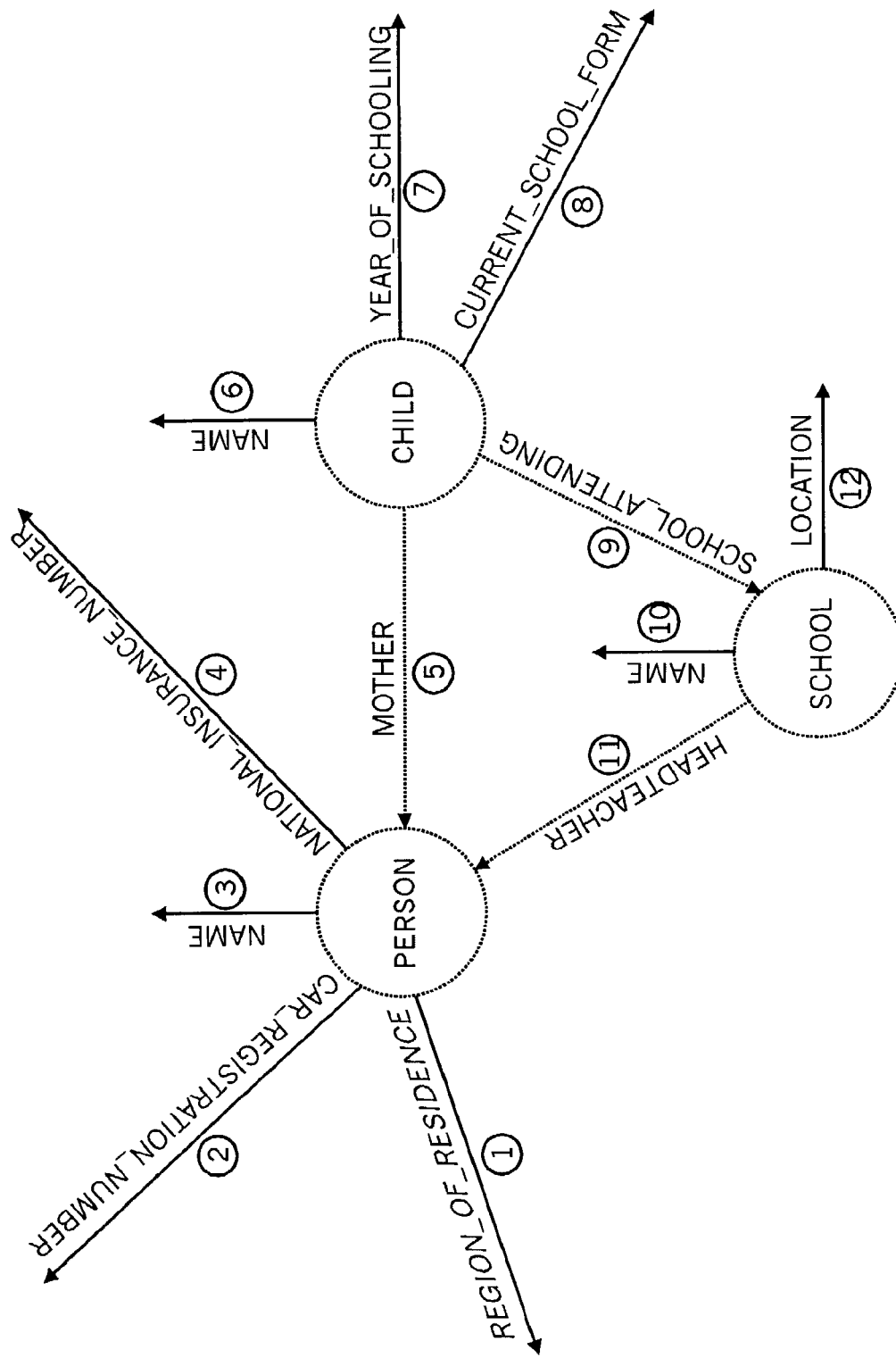
FIG. 4 is a graphical illustration of a sample ontology model.

Reference is now made to FIG. 4, which is a graphical illustration of a sample ontology model for municipality data, including three classes, Person, Child and School, as indicated by the three circular nodes in the graph, and including twelve properties, as indicated by the twelve directed edges in the graph. For notational convenience the properties in FIG. 4 are denoted by their numeral indices one through twelve, rather than by their character string names. Preferably, business modeler 310 enables a user to generate the model indicated in FIG. 4.

The ontology model of FIG. 4 can be represented by an XML document in conformance with the above XML schema, as follows.

```
<classes>
    <class label="Child" />
    <class label="Person" />
    <class label="School" />
```

-continued

```
            <class label="Integer" />
            <class label="String" />
        </classes>
        <functions>
            <function label="region_Of_Residence">
                <source>Person</source>
                <target>String</target>
            </function>
            <functionlabel="car_Registration_Number">
                <source>Person</source>
                <target>String</target>
            </function>
            <function label="personName">
                <source>Person</source>
                <target>String</target>
            </function>
            <function label="national_Insurance_Number">
                <source>Person</source>
                <target>Integer</target>
            </function>
            <function label="mother">
                <source>Child</source>
                <target>Person</target>
            </function>
            <function label="childName">
                <source>Child</source>
                <target>String</target>
            </function>
            <function label="year_Of_Schooling">
                <source>Child</source>
                <target>Integer</target>
            </function>
            <function label="current_School_Form">
                <source>Child</source>
                <target>Integer</target>
            </function>
            <function label="school_Attending">
                <source>Child</source>
                <target>School</target>
            </function>
            <function label="schoolName">
                <source>School</source>
                <target>String</target>
            </function>
            <function label="headteacher">
                <source>School</source>
                <target>String</target>
            </function>
            <function label="location">
                <source>School</source>
                <target>String</target>
            </function>
        </functions>
```

As mentioned hereinabove, an ontology model is akin to a schema for instances of the ontology. As such, a specific ontology model can be viewed in dual roles; namely, (1) as an instance of ontologies in general, and (2) as a schema for instances of the specific ontology model. Specifically, referring to the ontology model illustrated in FIG. 4, in addition to being represented as above, as an XML document conforming to an XML schema for ontology models, it can also be represented as an XML schema as follows.

```
<xs:complexType name="Child">
    <xs:attribute name="mother" type="xs:IDREF" />
    <xs:element name="name" type="xs:string" />
    <xs:element name="year_Of_Schooling" type="xs:integer" />
    <xs:element name="current_School_Form" type="xs:string" />
    <xs:attribute name="school_Attending" type="xs:IDREF" />
</xs:complexType>
```

-continued

```
<xs:complexType name="Person">
    <xs:attribute name="label" type="xs:ID" />
    <xs:element name="region_Of_Residence" type=" xs:string" />
    <xs:element name="car_Registration_Number" type="xs:string"
        minOccurs="0" />
    <xs:element name="name" type="xs:string">
    <xs:element name="national_Insurance_Number"
        type="xs:integer" />
</xs:complexType>
<xs:complexType name="School">
    <xs:attribute name="label" type="xs:ID" />
    <xs:element name="name" type=" xs:string" />
    <xs:element name="headteacher" type="xs:string"
        minOccurs="0" />
    <xs:element name="location" type="xs:string" />
</xs:complexType>
```

Although the example hereinabove uses an ontology model as the information model, the present invention applies as well to many other model types for the information model, including inter alia:

Unified Modeling Language (UML)

DARPA Agent Markup Language (DAML)

Ontology Inference Language (OIL)

Object Role Modeling

Topic Maps

Test Instance Generator 320

Test instance generator 320 is preferably used to generate test data for the information model. Alternatively, test instances may be generated by manual user input or by loading data from mapped physical data assets, according to the relevant mappings. Test data is typically used to demonstrate the information model and to validate its business rules.

Referring to the ontology model illustrated in FIG. 4, examples of test data are shown in Tables I, II and III.

TABLE I

Test instances for class Child

| | | |
|---|---|---|
| Class: Child | Child_1 | Child_2 |
| Property: mother | Person_1 | Person_2 |
| Property: name | Daniel Ashton | Peter Brown |
| Property: year_Of_Schooling | 10 | 7 |
| Property: current_School_Form | Mid Fifth | Lower Fourth |
| Property: school_Attending | School_1 | School_2 |

TABLE II

Test instances for class Person

| | | |
|---|---|---|
| Class: Person | Person_1 | Person_2 |
| Property: region_of_Residence | London | Warwick |
| Property: car_Registration_Number | NULL | NULL |
| Property: name | Linda Ashton | Amanda Brown |
| Property: national_Insurance_Number | 123456 | 673986 |

TABLE III

| Test instances for class School | | |
|---|---|---|
| Class: School | School_1 | School_2 |
| Property: name | Chelsea Secondary School | Warwick School for Boys |
| Property: headteacher | I. Heath | NULL |
| Property: location | London | Warwickshire |

The test instances above have been represented in tabular form. In a preferred embodiment of the present invention, test instances are represented as XML documents. Specifically, based on the XML schema listed above, the test instances can be represented as follows.

Data Rationalizer 340

Data rationalizer 340 is used to map schemas of physical data assets into the information model.

Referring again to FIG. 4, consider for example a relational database schema including relations $S_1$, $S_2$, $S_3$ and $S_4$ and attributes as follows.

$S_1$(Name, School_Attending, Mother_M_Number)

$S_2$(NI_Number, Name, Region, Car_Number)

```
<Child mother = "Person_1" school_Attending =
"School_1">
    <name>Daniel Ashton</name>
    <year_Of_Schooling>10</year_Of_Schooling>
    <current_School_Form>Mid Fifth</current_School_Form>
</Child>
<Child mother = "Person_2" school_Attending =
"School_2'>
    <name>Peter Brown</name>
    <year_Of_Schooling>7</year_Of_Schooling>
    <current_School_Form>Lower Fourth</current_School_Form>
</Child>
<Person label = "Person_1">
    <region_Of_Residence>London</region_Of_Residence>
    <name>Linda Ashton</name>
    <national_Insurance_Number>123456</national_Insurance_Number>
</Person>
<Person label = "Person_2">
    <region_Of_Residence>London</region_Of_Residence>
    <name>Amanda Brown</name>
    <national_Insurance_Number>673986</national_Insurance_Number>
</Person>
<School label = "School_1">
    <name>Chelsea Secondary School</name>
    <headteacher>I. Heath</headteacher>
    <location>London</location>
</School>
<School label = "School_2">
    <name>Warwick School for Boys</name>
    <location>Warwickshire</location>
</School>
```

Model Validator 330

Model validator 330 is used to validate test instances of an information model. Preferably, validation includes inter alia data type checking for properties, verifying business rules relating values of properties and verifying inverse property relationships.

For example, assume there are alternative combinations of business rules that may be applied to convert one or more properties to another property. A class Temperature, say, has properties centigradeValue, fahrenheitValue and kelvinValue and business rules for converting therebetween. Model validator 330 preferably converts the centigradeValue provided for a test instance into the fahrenheightValue (i) directly, and (ii) indirectly through kelvinValue as an intermediate value; and verifies that the two results are consistent. It is noted that since reasoning about such consistency automatically is intractable, use of test instances provides an efficient approach to validation, albeit only partial validation.

$S_3$(Name, Location, HeadTeacher)

$S_4$(Name, Year, Form)

Using data rationalizer 340, maps are generated from the above relations and their attributes into classes and properties of the ontology model illustrated in FIG. 4 as shown in Table IV. It is noted that the symbol "o" is used in the third column of Table IV to indicate composition of properties, and the numerical property indices used in the third column of Table IV correspond to those designated in FIG. 4.

TABLE IV

Mapping from the S relational database schema to the ontology model

| Schema | Ontology | Property Index |
| --- | --- | --- |
| $S_1$ | Class: Child | |
| $S_1$.Name | Property: name(Child) | 6 |
| $S_1$.School_Attending | Property: name(school_attending(Child)) | 10o9 |
| $S_1$.Mother_NI_Number | Property: national_Insurance_Number(mother(Child)) | 4o5 |
| $S_2$ | Class: Person | |
| $S_2$.NI_Number | Property: national_Insurance_Number(Person) | 4 |
| $S_2$.Name | Property: name(Person) | 3 |
| $S_2$.Region | Property: region_Of_Residence(Person) | 1 |
| $S_2$.Car_Number | Property: car_Registration_Number(Person) | 2 |
| $S_3$ | Class: School | |
| $S_3$.Name | Property: name(School) | 10 |
| $S_3$.Location | Property: location(School) | 12 |
| $S_3$.HeadTeacher | Property: name(headteacher(School)) | 3o11 |
| $S_4$ | Class: Child | |
| $S_4$.Name | Property: name(Child) | 6 |
| $S_4$.Year | Property: year_Of_Schooling(Child) | 7 |
| $S_4$.Form | Property: current_School_Form(Child) | 8 |

Although the example hereinabove involves mapping relational database schema into an information model, data rationalizer 340 preferably includes modules for mapping a variety of schema for physical data assets, including inter alia:

Relational database schema
XML schema/XML document type definitions (DTD)
COBOL Copy Books
Data Description Language (DDL)
Interface Description Language (IDL)
JAVA interface
Resource Description Framework (RDF)
Unified Modeling Language (UML)
DARPA Agent Markup Language (DAML)
Ontology Inference Layer (OIL)
Object role modeling
Topic maps
Custom schema More generally, to support as many schemas as possible, data rationalizer 340 preferably includes an application programming interface (API) for generating mappings from physical schema into the central information model, thereby enabling an application developer to rationalize a general schema.

Although data rationalizer 340 in FIG. 3 is described through mappings of physical data assets to the central information model, it can alternatively be used to map logical models, such as entity-relationship (ER) models, to the central information model. As such, there may exist multiple levels of logical models.

Data Thesaurus 350

Data thesaurus 350 is used to automate tasks of business data management, as described hereinbelow.

Transformation Generator 360

Transformation generator 360 is used to automatically generate queries and/or transformations for application on physical data assets, to accomplish tasks of business data management.

Referring again to the running example of FIG. 4, consider a second relational database schema including a relation T and attributes as follows.

T(Child_Name, Mother_Name, School_Location, Form)

Suppose it is desired to populate T using data conforming to the schema with relations $S_1$, $S_2$, $S_3$ and $S_4$ above. Prior to doing so, data rationalizer 340 is used to map the relations and attributes of T into the information model. Specifically, similar to Table IV above, the mapping for T can be represented as shown in Table V.

TABLE V

Mapping from the T relational database schema to the ontology model

| schema | Ontology | Property Index |
| --- | --- | --- |
| T | Class: Child | |
| T.Child_Name | Property: name(Child) | 6 |

TABLE V-continued

Mapping from the T relational database schema to the ontology model

| schema | Ontology | Property Index |
|---|---|---|
| T.Mother_Name | Property: name(mother(Child)) | 3o5 |
| T.School_Location | Property: location(school_attending(Child)) | 12o9 |
| T.Form | Property: current_school_form(Child) | 8 |

In a preferred embodiment of the present invention, transformation generator 360 derives an SQL query that populates the relation T. Such a query preferably takes the form

```
INSERT INTO T(Child_Name, Mother_Name, School_Location, Form)
    SELECT
    FROM
    WHERE;
```

In a preferred embodiment of the present invention, for each relation from the S relational database schema, an attribute of the relation that is a key is chosen as a "pivot," through which the other attributes are expressed. Specifically, referring back to Table IV, the key $S_1$.Name, corresponding to property 6, is chosen as the pivot for relation $S_1$, the key $S_2$.NI_Number, corresponding to property 4, is chosen as the pivot for relation $S_2$, the key $S_3$.Name, corresponding to property 10 is chosen as the pivot for relation $S_3$, and the key $S_4$.Name, corresponding to property 6, is chosen as the pivot for relation $S_4$, resulting in Table VI. The expressions in the "Symbols" column of Table VI express the composition of properties corresponding to attributes of the S relations relative to the keys chosen as pivots. The inverse notation, such as $6^{-1}$ is used to indicate the inverse of property 6. This is well defined since property 6 is a unique property in the ontology model.

TABLE VI

Symbols for the S relational database schema

| Relation | Symbols |
|---|---|
| $S_1$ | |
| | $10o9o6^{-1}$ |
| | $4o5o6^{-1}$ |
| $S_2$ | |
| | $3o4^{-1}$ |
| | $1o4^{-1}$ |
| | $2o4^{-1}$ |
| $S_3$ | |
| | $12o10^{-1}$ |
| | $3o11o10^{-1}$ |

TABLE VI-continued

Symbols for the S relational database schema

| Relation | Symbols |
|---|---|
| $S_4$ | |
| | $7o6^{-1}$ |
| | $8o6^{-1}$ |

Similarly, referring back to Table V, the key T.Child_Name is chosen as a pivot for relation T, resulting in Table VII.

TABLE VII

Symbols for the T relational database schema

| Relation | Symbols | Paths |
|---|---|---|
| T | | |
| | $3o5o6^{-1}$ | $(3o4^{-1}) \circ (4o5o6^{-1})$ |
| | $12o9o6^{-1}$ | $(12o10^{-1}) \circ (10o9o6^{-1})$ |
| | $8o6^{-1}$ | $(8o6^{-1})$ |

It is noted that Table VII contains an additional column referred to as "Paths," which expresses each of the T symbols in terms of the S symbols. Each such path provides the necessary link between the T attributes and the S attributes. Specifically, using the paths of Table VII and the symbols of Table VI, the following SQL query is derived.

```
INSERT INTO T(Child_Name, Mother_Name, School_Location, Form)
SELECT
    S1.Name AS Child_Name,
    S2.Name AS Mother_Name,
    S3.Location AS School_Location,
    S4.Form AS Form
FROM
    S1, S2, S3, S4
WHERE
    S2.NI_Number = S1.Mother_NI_Number AND
    S3.Name = S1.School_Attending AND
    S4.Name = S1.Name;
```

The above SQL query, when applied to data conforming to the S relational database schema, produces data conforming to the T relational database schema. When converting paths into SQL expressions the following algorithm is preferably used.

Step 1: When a path includes a symbol ($aob^{-1}$) from an S relation, then the relation attribute mapped to a is used in the SELECT clause of the SQL query, and the relation attribute mapping to b is used in the WHERE clause.

Step 2: When a path includes a composition of symbols, say $(aob^{-1}) \circ (boc^{-1})$, where $aob^{-1}$ is taken from a first S relation, say $S_1$, and $boc^{-1}$ is taken from a second S relation, say $S_2$, then $S_1$ and $S_2$ must be joined in the SQL query by the respective attributes mapping to b.

The exemplary mappings given in Table IV map each attribute of a given relation into properties of a single class. Thus the three attributes of the relation $S_1$(Name, School_Attending, Mother_NI_Number) are mapped to properties of the same class, Child. Similarly, the four attributes of the relation $S_2$(NI_Number, Name, Region, Car_Number) are mapped to properties of the same class, Person. It is apparent to those skilled in the art that in a more general setting, attributes of a single relation may be mapped to properties of different classes. The choice of which attributes are mapped to properties of which classes is preferably based on a condition referred to as a "column condition," since attributes are typically conceptualized as columns of a table.

Similarly, the attributes of a relation may be mapped to properties of the same class, but there may be several classes into which they can be mapped. For example, a single relation may store information about several species of animal, whereas separate classes may exist in the ontology model for each individual species. In such case, a condition referred to as a "row condition" is used to discriminate, based for example on the species of animal.

More generally, column and row conditions can be used together, to determine general conditional mappings from a relational database schema, or from a general physical data asset, to an ontology model.

Additional details regarding the algorithm for generating paths and for generating SQL queries therefrom are described in applicant's co-pending application U.S. Ser. No. 10/053,045, filed on Jan. 15, 2002, entitled "Method and System for Deriving a Transformation by Referring Schema to a Central Model."

Data Locator 370

Data locator 370 is used to locate data constructs within external data assets that correspond to prescribed constructs of the business model, a process referred to as "data discovery." Data discovery enables application developers to find sources, and enables data managers to review data assets. For example, data managers can use data discovery to find overlaps in data. In a preferred embodiment of the present invention, data discovery is used for imposing policies, such as security and access policies. Thus if a business asset is considered sensitive or private, data discovery is used to determine constructs of physical data assets that must be secured.

Referring again to the ontology model represented by FIG. 4 and referring to the relations $S_1$, $S_2$, $S_3$ and $S_4$ above, data locator can be used to locate attributes corresponding to a prescribed property. For example, referring to Table IV, data locator 370 preferably identifies attributes $S_1$.Mother_NI_Number and $S_2$.NI_Number as corresponding to the ontology property national_insurance_Number.

Query Processor 380

Query processor 380 is used to convert queries on the information model into queries on the physical data assets. Referring to the ontology model illustrated in FIG. 4, the following ontology language query is used to request names of children and national insurance numbers of their mothers, for mothers residing in London.

| SELECT: | Child.name, Child.mother.national_Insurance_Number |
|---|---|
| FROM: | Child, Person |
| WHERE: | Child.mother.region_Of_Residence = "London" |

Using query processor 380 preferably in conjunction with transformation generator 360, the above query is converted to the following corresponding SQL query:

| SELECT | $S_1$.Name, $S_1$.Mother_NI_Number |
|---|---|
| FROM | $S_1$, $S_2$ |
| WHERE | $S_2$.NI_Number = $S_1$.Mother_NI_Number AND $S_2$.Region = "London"; |

Deriving the above SQL query is an application of transformation generation, for a relation T(Child_Name, Mother_Name, Mother_Region).

Preferably query processor 380 parses the query on the information model and interprets it in the framework of transformation generation, so that in turn transformation generator 360 can derive the necessary SQL query.

It may thus be appreciated that the present invention encompasses not only an information model, but also all of the model's peripherals, including inter alia physical data assets and their mappings into the information model, test instances of the information model, transformations, queries and searches. Together, the information model and its paraphernalia are preferably implemented as a project.

Preferably, another component of a project is metadata; i.e., descriptors for constructs of the physical data assets.

The present invention enables collaborative modeling, whereby multiple users generate a project including a central information model. In distinction from distributed database systems, where multiple users collaboratively operate on data within a database, the collaborative modeling of the present invention is akin to collaborative development of a database schema. However, as mentioned hereinabove, the collaborative modeling of the present invention enables much more than model generation, in that it includes development of an entire project; i.e., an information model itself and its peripherals, including inter alia mappings of physical data assets into the information model, test instances, metadata, query and transformation generation, and searches.

In a preferred embodiment of the present invention, constructs of a project are divided into disjoint packages, which are preferably used as a basis for distributing the collaborative development efforts. Division into packages is similar to the way packages are used with Java software programs, and similar to the way folders are used within Microsoft Windows™. The division of the project into packages may involve fine granularity, whereby a package includes a small number of constructs, or coarse granularity, whereby a package includes a large number of constructs, or a mixed granularity whereby some packages are small and other packages are large.

Figure 5:
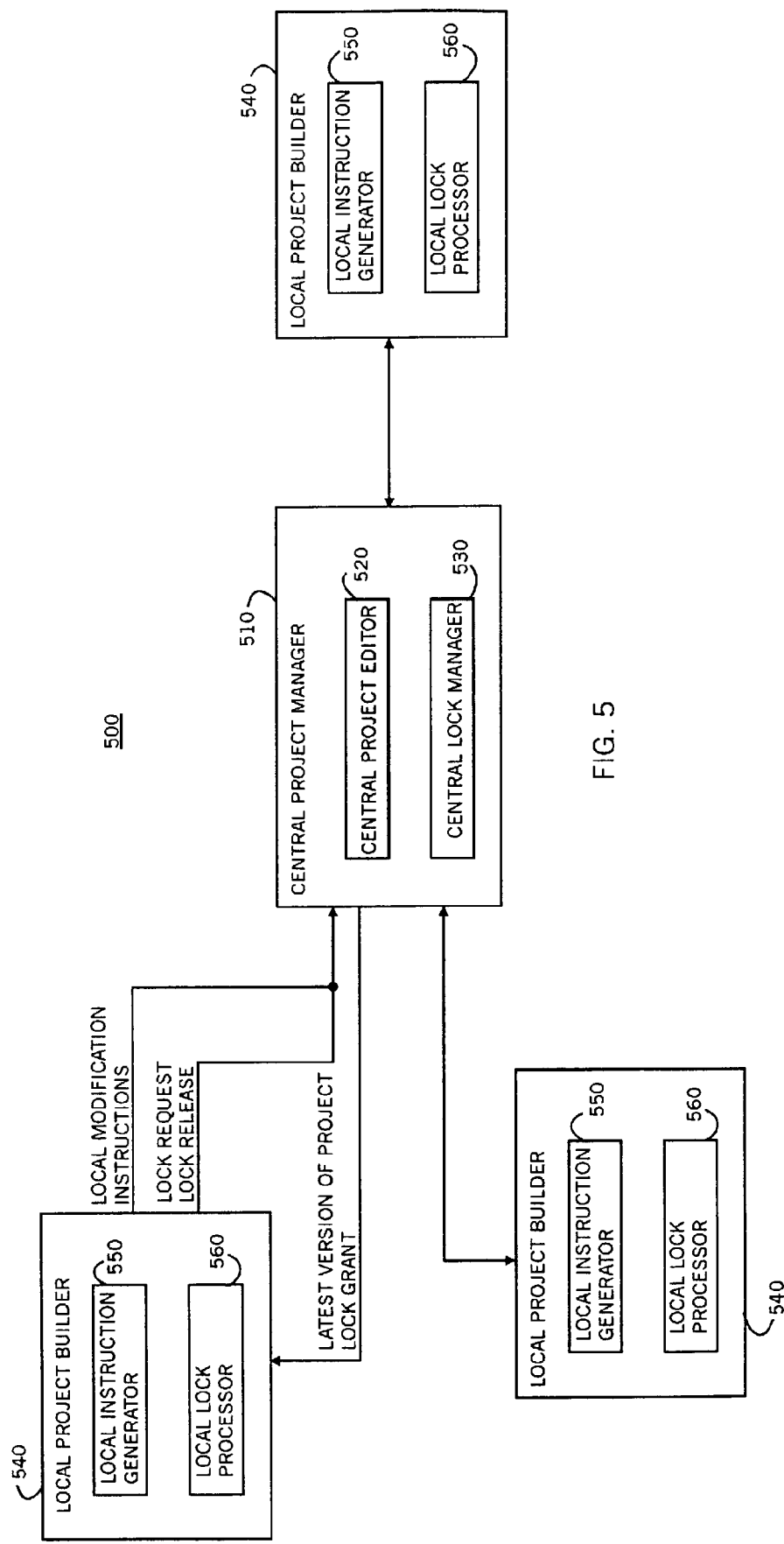
FIG. 5 is a simplified block diagram of a collaborative information modeling system, in accordance with a preferred embodiment of the present invention.

Reference is now made to FIG. 5, which is a simplified block diagram of a collaborative information modeling system, in accordance with a preferred embodiment of the present invention. Shown in FIG. 5 is a central project manager 510, used by an enterprise to control development of a central project by a plurality of users. Central project manager 510 includes a central project editor 520 for updating the central project from one version to another based on modifications provided by the plurality of users, and preferably for maintaining various versions of the central project. Central project manager 510 also includes a central lock manager 530 for managing locks on packages of the central project to control concurrency.

Also shown in FIG. 5 are distributed local project builders 540, for use by users in collaboratively developing the central project. Local project builders 540 preferably operate on local copies of the central project, and include local instruction generators 550 for generating instructions for modifying the central project. In a preferred embodiment of the present invention, local project builders 540 maintain a history of modification instructions, which may be forwarded to central project editor 520 for implementation. Maintaining a history of modification instructions is similar to operation of word processors, which enable a user to undo previous modifications while processing a document.

Local project builders 540 also include local lock processors 560 for requesting and releasing locks on packages of the central project. In a preferred embodiment of the present invention, a local project builder is constrained to obtain a lock on a package of the central project in order to modify such package of the central project.

Central Lock Manager 530

In order for a local project builder 540 to effect modifications to the central project, a lock on the impacted package of the central project preferably must first be obtained. Preferably, when a lock on a package of the central project is granted by central lock manager 530 to a local project builder 540, no other local project builder 540 can obtain a lock on such package, and thus no other local project builder can modify the locked package of the central project. When the local project builder 540 holding the lock on the package of the central project has completed its modifications, it preferably releases the lock so that another local project builder can subsequently obtain a lock and further modify the package.

The various constructs of a business model are inter-related. For example, classes, properties, inheritance relationships and business rules are related. Modifying a class may impact inter alia (i) properties having the class as source or target, and (ii) inheritance relationships for which such class is a subclass or superclass. Modifying a property may impact inter alia (i) business rules in which such property participates, and (ii) properties that are inherited from such property. Moreover modifying constructs of a business model may impact inter alia mappings of external assets into the business model. Similarly, modifying mappings of physical data assets into the information model may impact inter alia transformations and queries that were generated based on such mappings.

In a preferred embodiment of the present invention, when a local project builder 540 requests a lock from central lock manager 530 on designated constructs of the information model, central lock manager 530 provides a lock on one or more packages of the central project that include the designated constructs as well as other constructs potentially impacted by modifications to the designated constructs. For example, when a local project builder 540 requests a lock on a designated property of the information model, central lock manager 530 may provide a lock on a package of the central project that includes (i) the designated property, (ii) the source class of the designated property, (iii) mappings that map constructs of physical data assets to the designated property, and (iv) business rules in which the designated property participates. Thus it may be appreciated that a user of the present invention who wishes to participate in collaborative development of a project is not required to know the breakdown of the project into packages.

The present invention provides for flexibility in designing a collaborative project development system. Preferred embodiments of the present invention include a "thick" client architecture, a "thin" client architecture, and other architectures for local project builders 540. A thick client architecture is a client-side architecture in which a client computer performs most of the required application logic. Thick client architectures are generally characterized by large sizes of client-side software such as dynamic link libraries (DLLs). A thin client architecture is a server-side architecture in which a client computer performs little of the required application logic, most of which is performed by a server computer. Thin client architectures are typically characterized by small sizes of client-side software. Other architectures include distributed client-side and server-side processing, in which both the client and the server computers perform a significant part of the required application logic.

Figure 6:
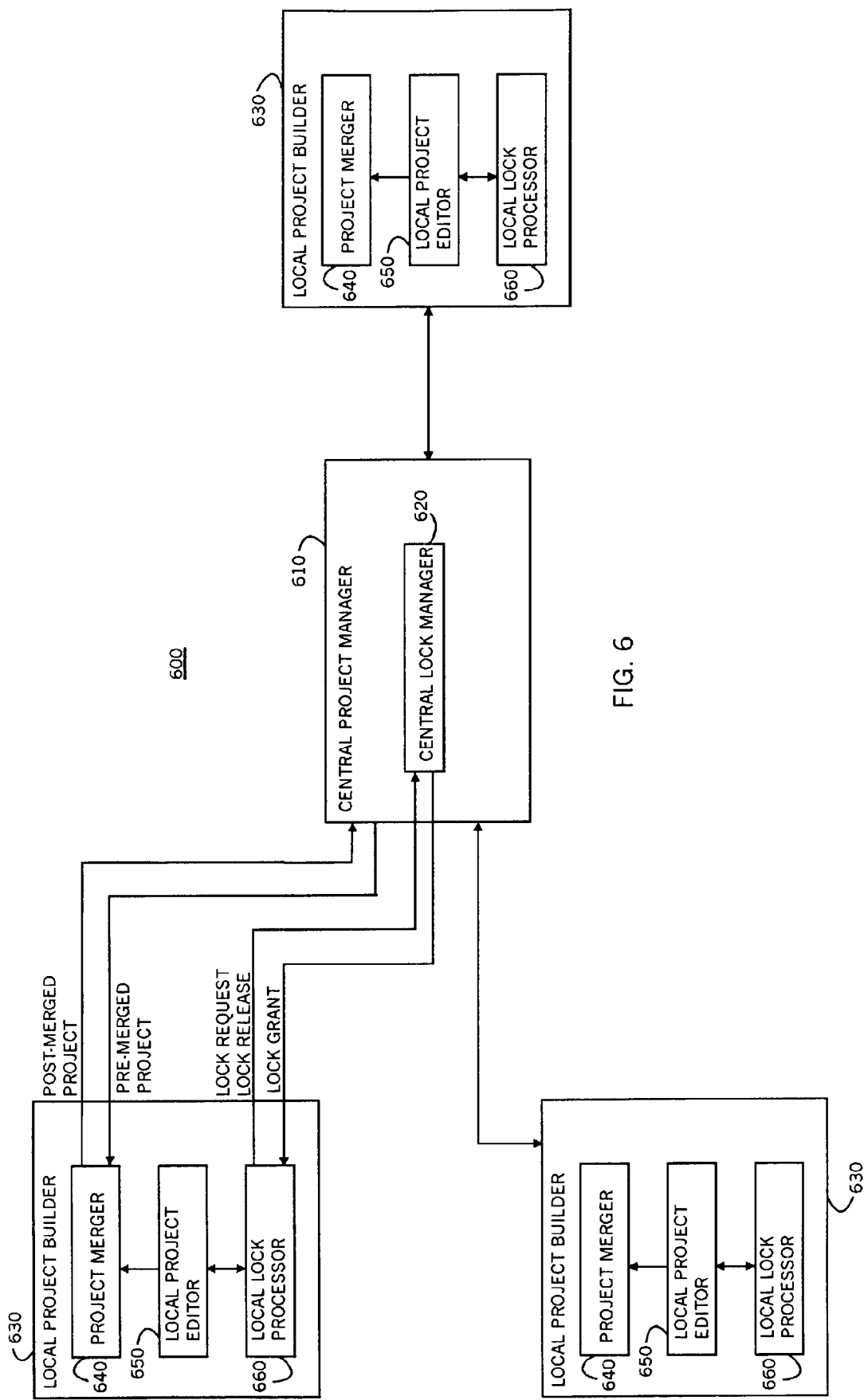
FIG. 6 is a simplified block diagram of a collaborative project development system using a thick client architecture, in accordance with a preferred embodiment of the present invention.

Reference is now made to FIG. 6, which is a simplified block diagram of a collaborative project development system 600 for developing a central project, using a thick client architecture, in accordance with a preferred embodiment of the present invention. Shown in FIG. 6 is a central project manager 610 including a central lock manager 620. Also shown in FIG. 6 are remote local project builders 630, each including a project merger 640, a local project editor 650 and a local lock processor 660. In a preferred embodiment of the present invention, local project builder 630 downloads the central project from central project manager 610. As the central project is being developed, several versions of the project may be stored within central project manager 610. Preferably, local project builder 630 downloads the latest version.

In order to modify constructs of the central project, local lock processor 660 preferably requests from central lock manager 620 check-out of one or more packages of the global business model; say, package X. Central lock manager 620 must grant local lock processor 660 a lock on package X, in order for local project builder 630 to modify this package of the central project. Once granted the lock on package X, local project editor 650 modifies package X by adding, deleting and changing constructs of the central project.

Upon completion of editing, or upon desire to effect changes to the central project prior to completion of editing, local lock processor 660 requests from central lock manager 620 check-in of the updated package X of the central project. During check-in, central project manager 610 sends the latest version of the central project to project merger 640, and project merger 640 merges the updated package X with the rest of the central project. It is noted that although local project builder 630 already has a local copy of the central project, it is necessary to send another copy, since other packages of the central project may have been updated in the interim, between local project builder 630's check-out and check-in or package X.

After project merger 640 completes the merge operation, local project builder 630 sends the merged project back to central project manager 610, to be used as the latest version of the central project.

In a preferred embodiment of the present invention, central project manager 610 includes a version control manager (not shown), to manage the many versions of the central project, and to enable access to older versions as necessary.

The thick-client nature of the system illustrated in FIG. 6 is reflected (1) in local project builder 630 downloading the entire central project and editing its own local copy of the project; and (2) in local project builder 630 including project merger 640, which performs the typically intensive merge operation.

Figure 7:
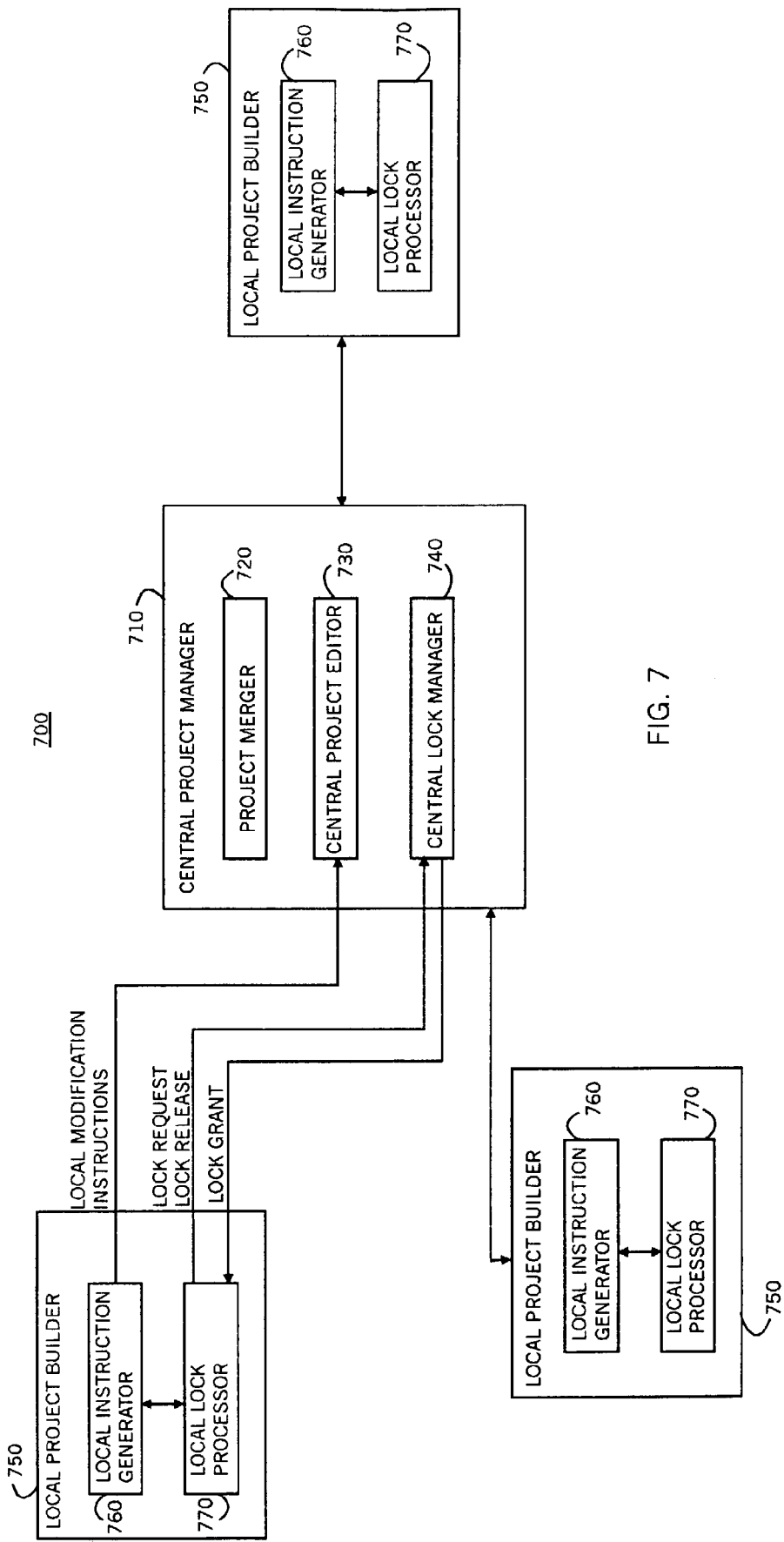
FIG. 7 is a simplified block diagram of a collaborative project development system using a thin client architecture, in accordance with a preferred embodiment of the present invention.

Reference is now made to FIG. 7, which is a simplified block diagram of a collaborative project development system 700 for developing a central model, using a thin client architecture, in accordance with a preferred embodiment of the present invention. Shown in FIG. 7 is a central project manager 710, including a project merger 720, a central project editor 730 and a central lock manager 740. Also shown in FIG. 7 are remote local project builders 750, each including a local instruction generator 760 and a local lock processor 770.

Local project builder 750 preferably does not download the central project, but instead interactively views the project residing at central project manager 710 using a viewer (not shown) for navigation.

In order for local project builder 750 to modify constructs of the central project, local lock processor 770 preferably requests a lock from central lock manager 740 on one or more packages of the central project containing such constructs; say, package X. When the lock is granted, local project builder 750 modifies constructs of the central project within package X. Preferably, the modifications performed by local project builder 750 are recorded as sequential instructions by local instruction generator 760; for example, instructions to (1) delete an existing property; (2) add a new class; (3) change an inheritance relationship; and (4) change a business rule. Such changes may be displayed progressively by central project manager 710, or alternatively by local project builder 750.

When local project builder 750 is ready to commit its changes to the central project, it sends the sequence of modification instructions generated by local instruction generator 760 to central project editor 730. Central project editor 730 preferably applies the instructions to package X of the central model, and project merger 720 merges the updated package X into the current version of the central project, to generate the next version thereof.

Alternatively, central project editor 730 may apply the modification instructions directly to the central project, thereby obviating the need to use project merger 720 for performing a merge operation.

The thin client nature of the system illustrated in FIG. 7 is reflected (1) in local project builder 750 not having to download the central project, and (2) in central project manager 710 performing the typically intensive task of merging. This is to be contrasted with FIG. 6, in which the merge operation is performed on the client side.

Figure 8:
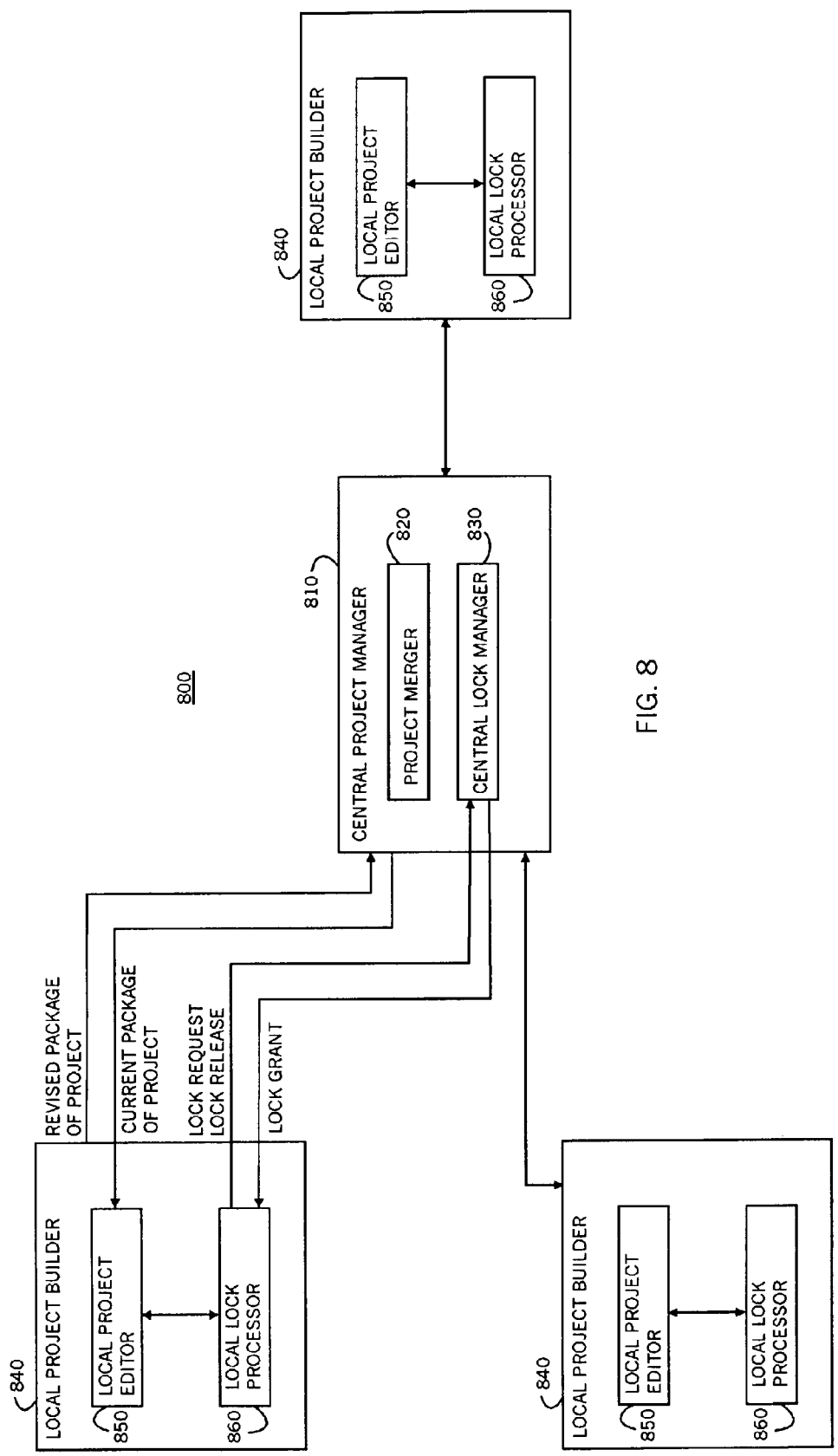
FIG. 8 is a simplified block diagram of a collaborative project development system using a third client architecture, in accordance with a preferred embodiment of the present invention.

Reference is now made to FIG. 8, which is a simplified block diagram of a collaborative project development system 800 for developing a central project, using a third client architecture, in accordance with a preferred embodiment of the present invention. Shown in FIG. 8 is a central project manager 810 including a project merger 820 and a central lock manager 830. Also shown in FIG. 8 is a local project builder 840 including a local project editor 850 and a local lock processor 860. Local project builder 840 navigates the central project, either using a viewer (not shown) to interactively view the central project residing at central project manager 810, or by downloading the central project and using a viewer to view its own local copy of the project.

In order to modify constructs of the central project, local lock processor 860 requests check-out for one or more packages of the central project containing such constructs; say, package X. Central lock manager 830 grants a lock on package X to local lock processor 860. Central project manager 810 then sends its current version of package X to local project builder 840, which local business builder 840 then modifies using local project editor 850.

When local project builder 840 desires to incorporate its revised package X back into the central project, it checks in package X and sends the revised package X back to central project manager 810. Project merger 820 then merges the revised package X with the rest of the central project, and uses the merged project as its latest version.

It is noted that the system illustrated in FIG. 8 distributes the application logic using both client-side and server-side processing. Local project builder 840 performs editing on its own local copy of package X, and central project manager 810 performs the typically intensive operation of project merging.

Figure 9:
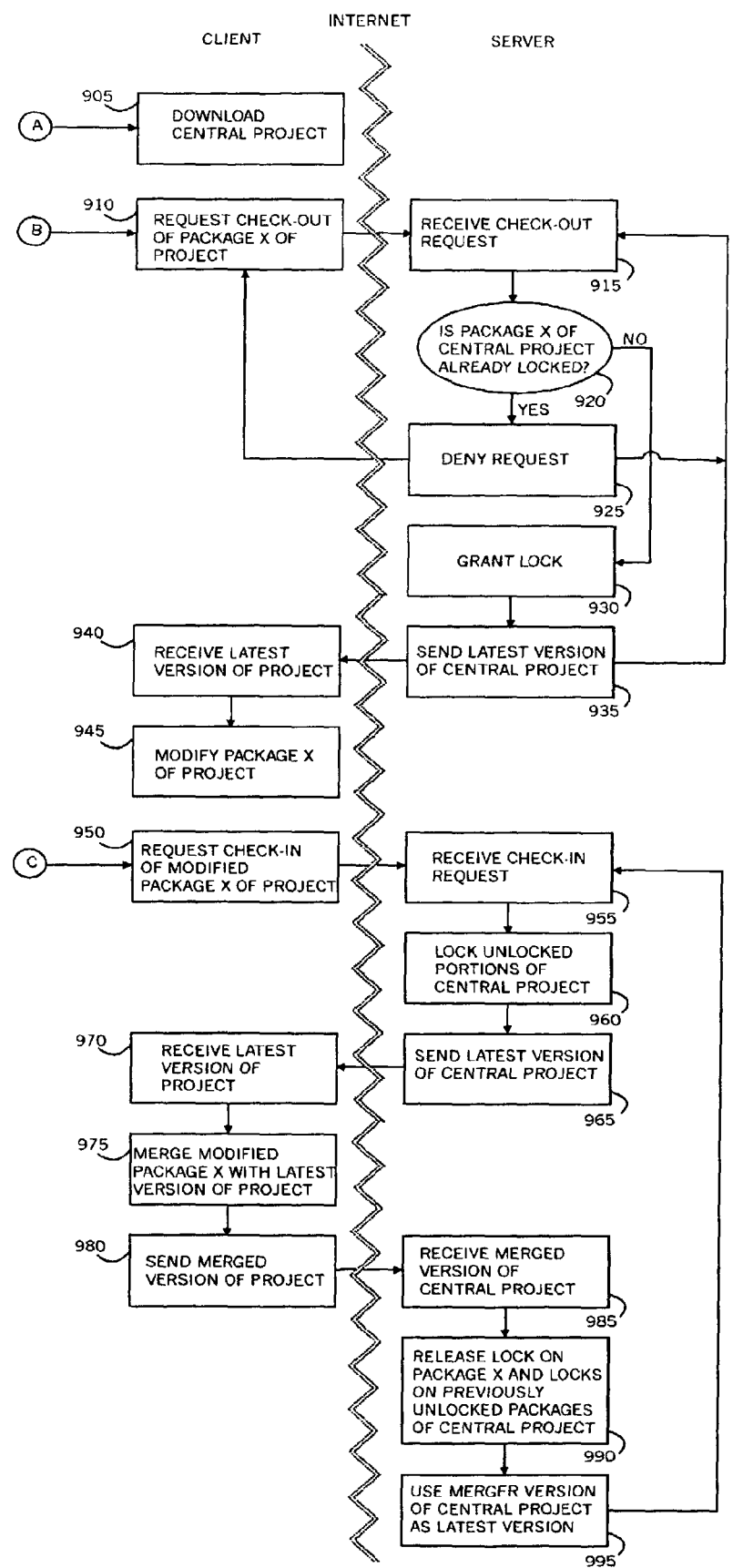
FIG. 9 is a simplified flowchart of a method for collaborative project development using a thick client architecture, in accordance with a preferred embodiment of the present invention.

Reference is now made to FIG. 9, which is a simplified flowchart of a method for collaborative project development using a thick client architecture, in accordance with a preferred embodiment of the present invention. The flowchart in FIG. 9 corresponds to the system for developing a central project illustrated in FIG. 6. FIG. 9 includes two columns. The left column indicates steps performed by a client computer, such as local project builder 630 (FIG. 6), and the right column indicates steps performed by a server computer, such as central project manager 610. FIG. 9 includes three actions, labeled A, B and C. Action A corresponds to the client downloading a copy of the central project. Action B corresponds to the client checking out a package of the central project and modifying its local copy of the package. Action C corresponds to the client checking-in its local modified package of the central project.

At step 905 the client downloads the central project from the server. Preferably the server transmits its latest version of the central project. At step 910 the client requests check-out of package X of the central project. At step 915 the server receives the client's request, and at step 920 the server determines whether or not package X is already locked. If package X is already locked, then the server denies the request at step 925 and returns to step 915 to process additional check-out requests. In this case, the client attempts another check-out request at step 910 at a later time.

If it is determined at step 920 that package X is not locked, then the server grants the client a lock on package X at step 930. At step 935 the server transmits its latest version of the central project to the client, and returns to step 915 to process additional check-out requests. It is noted that although the client already downloaded the central project at step 905, the server preferably transmits the central project at step 935, as the project may have been changed in the interim, between steps 905 and 935. At step 940 the client receives the latest version of the central project, and at step 945 the client modifies package X of its local copy of the project by adding, deleting or changing constructs of the project included within package X.

At step 950 the client requests check in of the modified package X. At step 955 the server receives the check-in request. At step 960, in preparation for the check-in operations, the server locks any unlocked packages of the central project, so that such packages cannot be modified during the check-in operations. Preferably, the server keeps a record of which packages it locks at step 960, so that it can unlock them when the check-in is complete. At step 965 the server transmits its latest version of the central project to the client. It is again noted that although the server already transmitted the central project to the client at step 935, the server preferably sends the central project again at step 965, as the project may have been changed in the interim, between steps 935 and 965. At step 970 the client receives the latest version of the central project. At step 975 the client merges its modified package X with its local copy of the central project, thereby updating the project. The merge operation is described in detail hereinbelow. At step 980 the client sends the entire updated project back to the server. At step 985 the server receives the updated project, thereby completing the check-in operations. At step 990 the server unlocks package X and the other packages that it locked at step 960. At step 995 the server uses the updated project as its latest version, and loops back to step 955 to process additional check-in requests.

Figure 10:
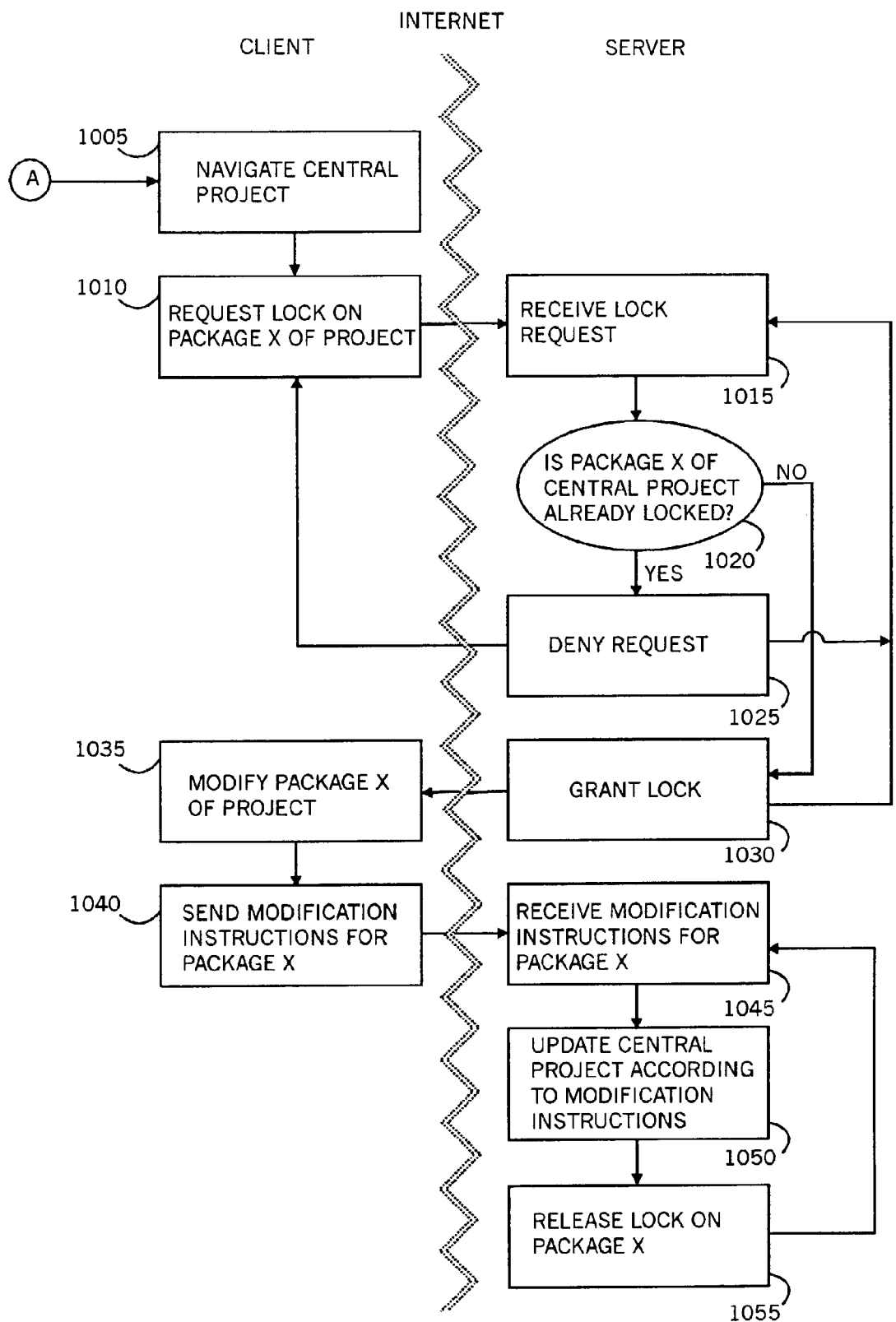
FIG. 10 is a simplified flowchart of a method for collaborative project development using a thin client architecture, in accordance with a preferred embodiment of the present invention.

Reference is now made to FIG. 10, which is a simplified flowchart of a method for collaborative project development using a thin client architecture, in accordance with a preferred embodiment of the present invention. The flowchart in FIG. 10 corresponds to the system for developing a central project illustrated in FIG. 7. FIG. 10 also includes two columns. The left column indicates steps performed by a client computer, such as local project builder 750 (FIG. 7), and the right column indicates steps performed by a server computer, such as central project manager 710.

At step 1005 the client navigates the central project residing at the server computer. At step 1010 the client requests a lock on package X of the project, in order to modify constructs included within package X. At step 1015 the server receives the lock request and at step 1020 the server determines whether or not package X is already locked. If not, then at step 1025 the server denies the lock request and returns to step 1015 to process additional requests. Preferably, the client returns to step 1010 and requests the lock again at a later time.

If the server determines at step 1020 that package X is unlocked, then it grants the lock to the client at step 1030. At step 1035 the client modifies package X of the project, and preferably records the modifications as a sequence of instructions. At step 1040 the client sends the sequence of modification instructions to the server for commitment in the central project. At step 1045 the server receives the sequence of modification instructions, and at step 1050 the server updates the central project accordingly. At step 1055 the server releases the lock on package X of the central project and returns to step 1045 to receive additional modification instructions.

It may be appreciated by those skilled in the art that the lock mechanism may be avoided in the thin client embodiment, since the server can control the concurrency of modification instructions. Specifically, steps 1010, 1015, 1020, 1025, 1030 and 1055 can be avoided, and central lock manager 740 and local lock processor 770 can be omitted from FIG. 7. A factor in determining whether or not it is advantageous to use a lock mechanism is the granularity of the number of modification instructions sent from the client to the server at once. If many modifications are generated by the client and sent to the server at once over long time intervals, it is typically preferable to use a lock mechanism. On the other hand, if only a few modifications are sent to the server at once over short time intervals, such as modifications within a single transaction, then the lock mechanism is preferably avoided.

Figure 11:
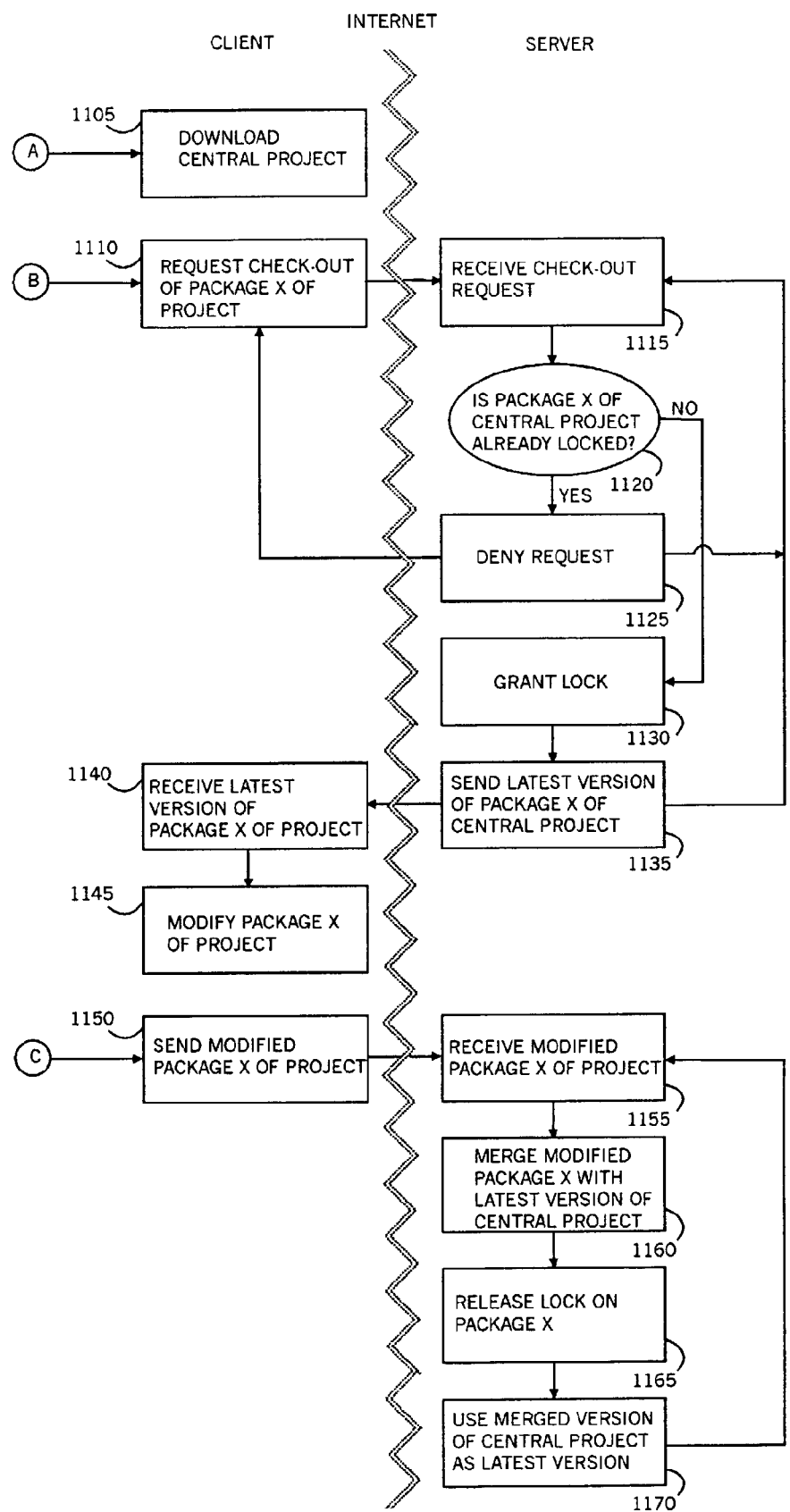
FIG. 11 is a simplified flowchart of a method for collaborative project development using a third client architecture, in accordance with a preferred embodiment of the present invention.

Reference is now made to FIG. 11, which is a simplified flowchart of a method for collaborative project development using a third client architecture, in accordance with a preferred embodiment of the present invention. The flowchart in FIG. 11 corresponds to the system for developing a central project illustrated in FIG. 8. FIG. 11 also includes two columns. The left column indicates steps performed by a client computer, such as local project builder 840 (FIG. 8), and the right column indicates steps performed by a server computer, such as central project manager 810. FIG. 11 includes three actions, labeled A, B and C. Action A corresponds to the client downloading a copy of the central project. Action B corresponds to the client checking out a package of the central project and modifying its local copy of the package. Action C corresponds to the client checking-in its local modified package of the central project.

At step 1105 the client downloads the central project from the server. Alternatively, client 1105 may navigate the central project residing at the server computer instead of downloading the project. At step 1110 the client requests check-out of package X of the project, in order to modify constructs of the project within package X. At step 1115 the server receives the check-out request and at step 1120 the server determines whether or not package X of the central project is already locked. If so, then at step 1125 the server denies the check-out request and returns to step 1115 to process additional check-out requests. In the meantime, the client again requests check-out of package X at step 1110, at a later time.

If it is determined at step 1120 that package X of the project is unlocked, then at step 1130 the server grants a lock on package X to the client. At step 1135 the server sends the latest version of package X to the client, and returns to step 1115 to process additional check-out requests. It is noted that although the client may have downloaded the project at step 1105, nevertheless the server sends package X to the client at step 1135 since it may have been changed in the interim, between steps 1105 and 1135. At step 1140 the client receives the latest version of package X. At step 1145 the client modifies package X of the project by adding, deleting and changing constructs of the project included within package X.

At step 1150 the client requests check-in of package X, in order to commit the changes to the central project, and sends the modified package X to the server. At step 1155 the server receives the modified package X and at step 1160 the server merges the package portion X with the latest version of the central project. The merge operation is described in detail hereinbelow. At step 1165 the server releases the lock on package X. At step 1170 the server uses the merged project as its latest version, and returns to step 1155 to process additional check-ins.

It may be appreciated by those skilled in the art that although steps 910 (FIG. 9), 1010 (FIG. 10) and 1110 (FIG. 11) indicate the client requesting check-out of package X of the central project, or a lock on package X of the central project, the client may instead request check-out or lock of specific constructs of the central project, in which case the server determines the appropriate package(s) of the project for check-out or locking. Thus it may be appreciated that it is not necessary for the client to know the manner in which the central project is divided up into packages.

Merging an Updated Package into a Project

The systems illustrated in FIGS. 6, 7 and 8 include a project merger, which merges an updated package X of a project with the rest of the project. As mentioned hereinabove, constructs of a project are divided into packages. For an information model that is an ontology model, such constructs include inter alia classes, properties, inheritance relationships, business rules, mappings of physical data assets into the ontology model, queries and transformations.

These constructs are inter-related. Thus a class is related to its properties. A property is related to its source and target classes. An inheritance relationship is related to the subclass and the superclass. A business rule relating properties of the ontology model is related to those properties included therein. A mapping of a physical data asset into the ontology is related to the classes and properties into which constructs of the physical data asset are mapped. Transformations and queries are related to the mappings of the physical data assets into the ontology model.

Thus when a modified package of the project is merged with the rest of the project, typically modifications made to the package impact constructs included within other packages of the project. And this can result in inconsistencies. Preferably, to handle such inconsistencies, the present invention includes data structures to represent (i) constructs which belong to other constructs, and (ii) constructs that lack referential integrity, as described in what follows.

In a preferred embodiment of the present invention, a construct X "belongs to" a construct Y if Y cannot exist without X. Specifically, regarding an information model which is an ontology model, for a given class C of an ontology, the following constructs all belong to C:

1. properties having class C as source class;
2. inheritance relationships having class C as the subclass;
3. business rules relating properties of class C; and
4. test instances of class C.

Similarly, for a given physical data asset A, the mapping of A into the information model belongs to A. Similarly, for a given mapping M of constructs of a physical data asset into a class C, the mappings of constructs of the physical data assets into properties of class C belong to M.

In a preferred embodiment of the present invention, organization of a project into packages is managed so that whenever a construct X belongs to a specific package, all constructs that belong to X also belong to the same package. Moreover, when a construct X is deleted from a project, constructs belonging to X are also deleted therefrom. This assures that a project does not contain a construct Y belonging to a construct X, when construct X no longer exists.

In addition, when a construct X is copied from one project to another, the constructs belonging to X are copied along therewith.

A construct X lacks "referential integrity" if the construct has not been deleted, but has a dangling reference associated therewith. Examples of constructs that lack referential integrity include:

A property whose target class has been deleted;
A business rule relating properties, one or more of which have been deleted; and
A mapping of a physical data asset into a class or property that has been deleted.

In a preferred embodiment of the present invention, constructs that lack referential integrity are maintained, but assigned an "orange" state, thereby flagging them as being incompletely defined. The name "orange" state is used since such constructs are preferably displayed in orange by a graphical user interface. A user encountering a construct in the orange state may then repair the construct by supplying the missing constructs being referenced.

In a preferred embodiment of the present invention, each construct of a project is assigned a unique ID. Use of a unique ID enables an internal data structure for the project to identify:

which constructs belong to others;
the source and target classes of properties;
the subclasses and superclasses of inheritance relationships;
the properties which participate in a business rule;
properties that are inverse to one another;
constructs of physical data assets and constructs of the information model that are mapped to one another; and
missing references for constructs that are in the orange state.

As described in applicant's co-pending application U.S. Ser. No. 10/104,785, filed on Mar. 22, 2002, entitled "Run-Time Architecture for Enterprise Integration with Transformation Generation," determination of which constructs of a project are in the orange state is based on impact analysis. Impact analysis recursively identifies constructs of the project that are impacted by a change made to a given construct.

Regarding the merge operation, the present invention preferably performs a merge by generating a merged project. The merged project is generated by copying constructs from the user's local updated package X and from the other packages of the central project. Copied constructs preferably retain their unique ID, thus making it possible to preserve references from one construct to another in the merged project. For example, if class C is the target of property P in the user's local updated package X, then this dependency is preserved within the merged project. Because the packages preferably comply with the restriction that for each construct that they contain, they also contain the constructs belonging thereto, the merged project will not suffer from a condition whereby a construct Y belonging to a construct X is present, without X being present.

However, the merged project may suffer from constructs that lack referential integrity. As such constructs are encountered, they are put into the orange state.

In addition, the merged project may suffer from invalidities whereby an inherited property no longer exists. An inherited property is not considered as belonging to the property from which it inherits. The rationale for this is that an inherited property and the property from which it inherits belong to different classes, and different classes are not required to be in the same package. Thus, situations can arise in a merged project whereby an inherited property is present without the property it inherits from existing. In such cases, the present invention preferably deletes such inherited properties from the user's updated package X, and puts the appropriate constructs depending on such property into the orange state.

Further in addition, the merged project may suffer from data type inconsistencies, whereby use of a property within a business rule becomes ill-defined when the target class of the property is changed. For example, a business rule relating two numeric properties $P_1$ and $P_2$, each with target class Real-Number, becomes inconsistent if the target of $P_1$ is changed to class String. For another example, a business rule may involve a composite property $P_1 o P_2$. The composition of $P_1$ and $P_2$ is only defined when the target of $P_1$ is a subclass of the source of $P_2$; as such, modification of the target class of $P_1$ may make such composition ill-defined.

However, it may be appreciated that data type inconsistencies generally do not arise in a merged project, since a business rule generally relates properties of the same class and, as such the business rule belongs to such class. Since the business rule and the class to which it belongs reside within the same package, a user modifying the package is generally able to ensure data type consistency within the business rule.

Preferably, where updates performed by a user result in inconsistencies, say, one or more constructs being in the orange state, or inherited properties being deleted or business rules becoming type inconsistent, the user is issued an advisory warning in advance. Preferably, the user is also given the opportunity to cancel the offending modifications, or further modify the updated package X so as to rectify the inconsistencies.

Delete, Purge and Garbage Collection

In a preferred embodiment of the present invention, when a user editing a project deletes a construct, the construct is initially moved into a "deleted" state, but not yet purged from memory. The deleted construct preferably still appears in a GUI as being "grayed out," as is often the appearance used for inactive controls within a GUI. The deleted construct still maintains its unique ID, as described hereinabove, and references to the deleted construct are maintained until modified by the user. For example, if the target class for a property is deleted, then the target class is moved into the deleted state, and the property references a deleted class as its target.

In the course of evolution of a project, at various appropriate times, as described hereinbelow, garbage collection is applied to the project, at which times deleted constructs may be purged from memory. In a preferred embodiment of the present invention, garbage removal follows a "mark and sweep" algorithm, whereby a graph including constructs of the project as nodes and their inter-dependencies as directed edges is marked, followed by a sweep that purges un-marked constructs. The "mark" preferably proceeds by traversing the graph beginning with a chosen root element, and marking each construct that is referenced by a previously traversed construct. The "sweep" preferably traverses all constructs, and purges those that are un-marked. An unmarked construct corresponds to a construct that is not referenced by any other construct within the connected component of the graph emanating from the root element.

In a preferred embodiment of the present invention, the graph of project constructs and their inter-dependencies is preferably augmented within a special "root element" that has a directed edge to each construct that is not in the deleted state. Using the augmented graph ensures that only deleted constructs are purged during the "sweep."

Figure 12:
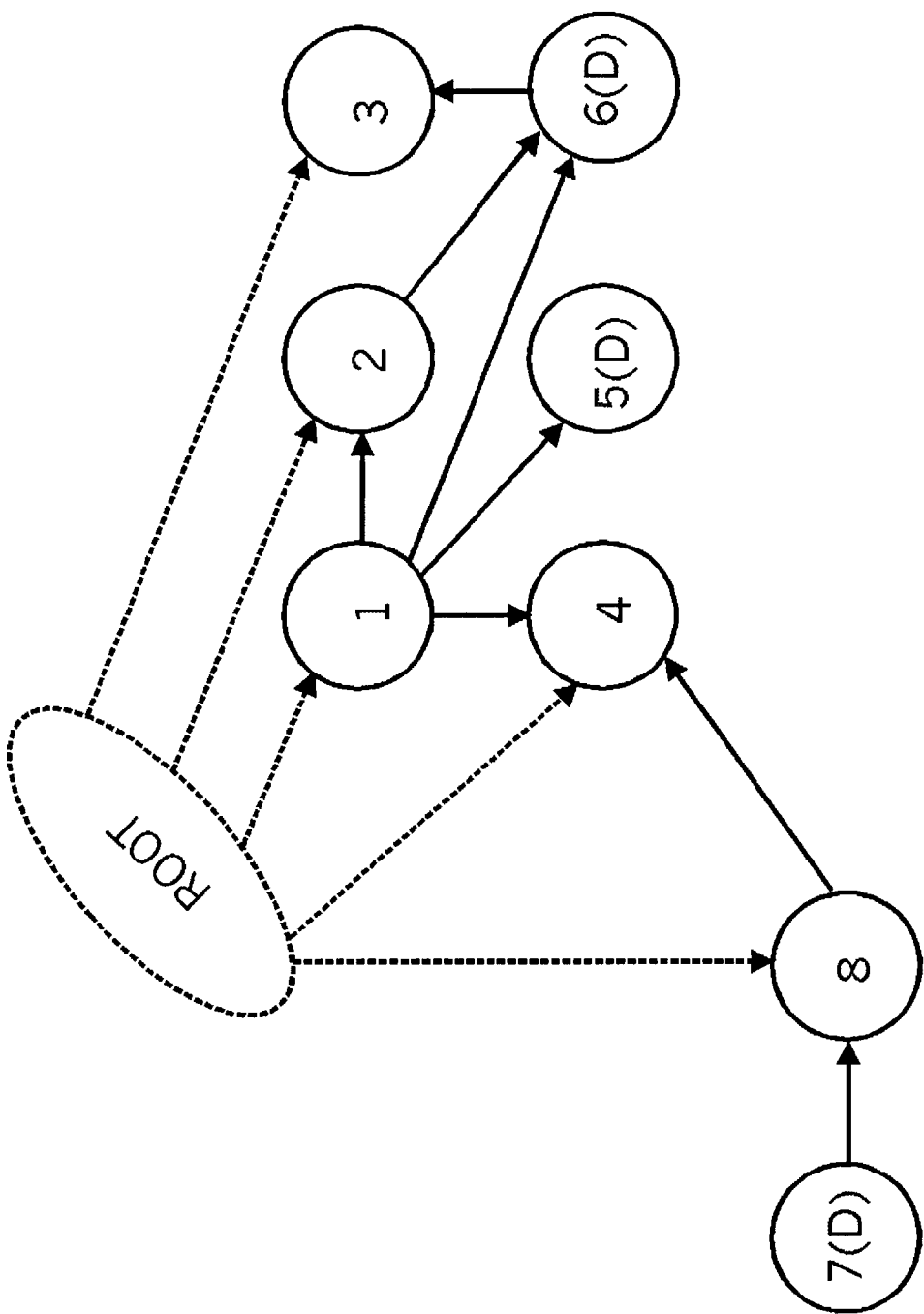
FIG. 12 is an illustration of an augmented graph used to purge project constructs, in accordance with a preferred embodiment of the present invention.

Reference is now made to FIG. 12, which is an illustration of an augmented graph used to purge project constructs, in accordance with a preferred embodiment of the present invention. Shown in FIG. 12 is a graph with nodes numbered 1-8 designating constructs, and directed edges indicating inter-dependencies. Nodes 5, 6 and 7 are indicated as having been deleted from the project.

A root node is augmented to the graph, with directed edges from the root node to the non-deleted nodes 1-4 and 8. The augmented root node and the edges emanating therefrom are indicated in FIG. 12 with dashed lines. Beginning with the root node, the graph is preferably traversed in the directions of the edges and each node encountered is marked. As can be seen in FIG. 12, this results in all nodes being marked, except for node 7. After the marking is performed, a sweep is made of all nodes and the un-marked nodes are purged from memory. With respect to FIG. 12, node 7 is thus purged from memory.

Regarding the "modified mark and sweep" method described hereinabove, it is noted that the only nodes purged are those that are both deleted and not referenced by any non-deleted nodes. It is further noted that had the graph in FIG. 12 not been augmented with the root node, then, using node 1 as the root node would result in both nodes 7 and 8 being purged, even though node 8 was never deleted from the project. It is further noted that in general the graph of project constructs and inter-dependencies does not have closed cycles, since there is a hierarchy of dependencies. Specifically, with regards to a central model that is an ontology model such a hierarchy includes inter alia: (i) dependencies of transformations and queries upon mappings of physical assets into the ontology model and upon constructs of the ontology model; (ii) dependencies of mappings of physical assets into the ontology model upon the ontology model constructs; (iii) dependencies of business rules of the ontology model upon properties of the ontology model; (iv) dependencies of properties of the ontology model upon classes of the ontology model and their inheritance relations; (v) dependencies of inheritance relations of the ontology model upon classes of the ontology model.

As mentioned hereinabove, garbage collection is preferably applied to the project only at appropriate times. Such an appropriate garbage collection time occurs when a copy of the project residing on a specific computer is known to be current; for example, if the entire project is checked out to a single user. Another such appropriate garbage collection time occurs when a user working on a part of the project is ready to export his part of the project. In such a case, garbage removal is preferably applied to the part of the project on the user's computer prior to export.

Figure 13:
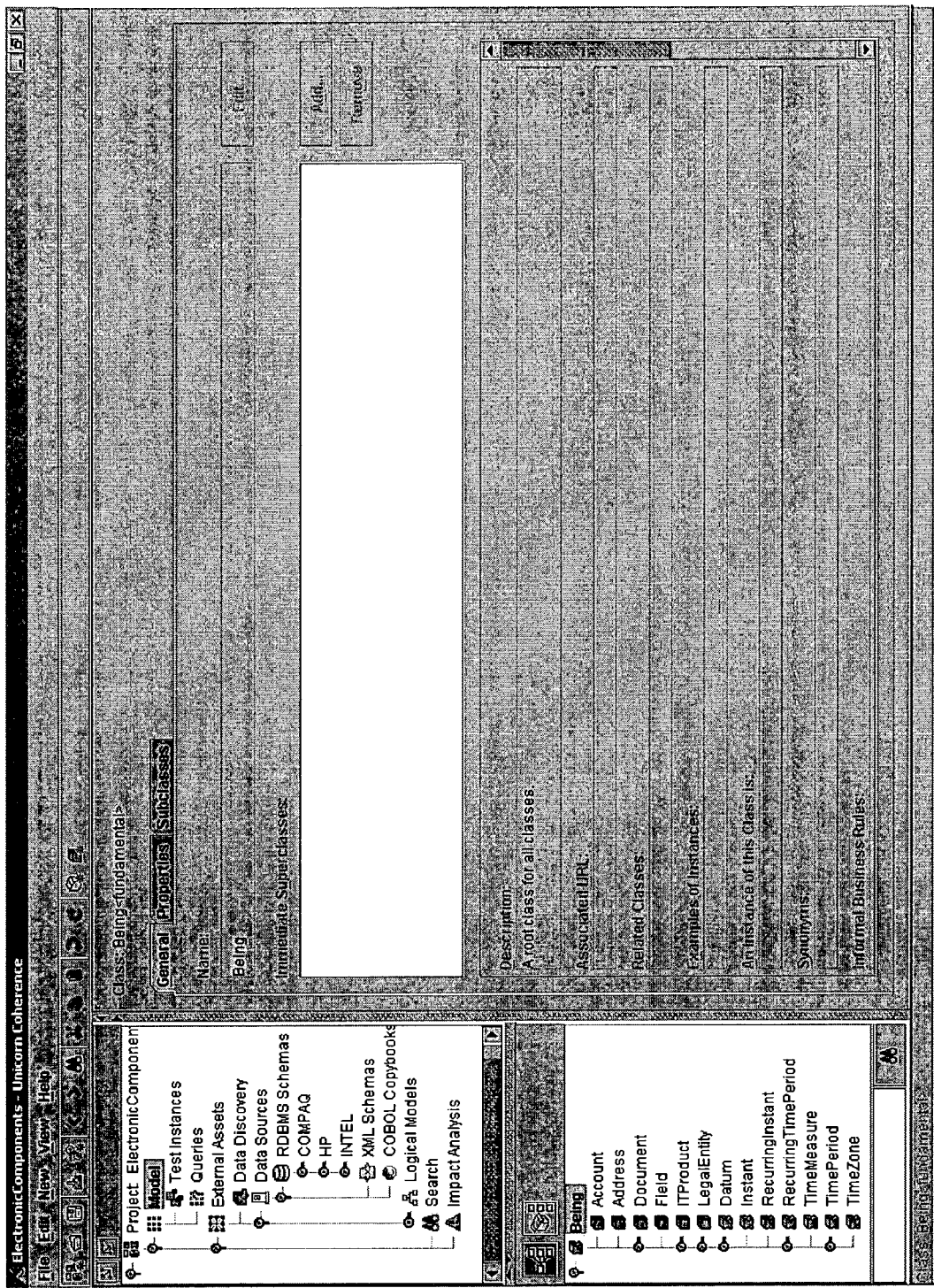
FIG. 13 is an illustration of a user interface for a navigator that interactively views a multiplicity of business concepts, in accordance with a preferred embodiment of the present invention.

Reference is now made to FIG. 13, which is an illustration of a user interface for a navigator that interactively views a multiplicity of business concepts, in accordance with a preferred embodiment of the present invention. As shown in the upper left pane of the user interface, concepts and tasks including model, test instances, queries, external assets, data discovery, data sources, logical models, search and impact analysis are organized together as a single project within a common navigator.

As may be appreciated from FIG. 13, the present invention preferably provides a single integrated environment for metadata, modeling, data semantics/rationalization, data management and automated thesaurus services.

In reading the above description, persons skilled in the art will realize that there are many apparent variations that can be applied to the methods and systems described.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An enterprise information unification system comprising:
    a memory for storing a plurality of components; and
    a processor for executing the plurality of components, the plurality of components comprising:
    an information modeler for modeling business entities and their properties as an information model, the information model comprising business constructs, wherein the business constructs include business rules identifying relationships among class properties, wherein the information modeler generates the information model using a plurality of physical data assets as inputs, and wherein the information modeler further comprises:
        a model simulator for simulating the information model, wherein a test instance generator populates data that simulates actual enterprise data; and
        a model validator for validating a simulation of the information model;
    a data rationalizer for generating mappings from the plurality of physical data assets to the information model, the plurality of physical data assets comprising data asset constructs, wherein the data rationalizer describes to which business constructs the data asset constructs relate, and wherein the data rationalizer further comprises:
        a synchronizer for synchronizing updates to at least one physical data asset of the plurality of physical data assets with the information model; and
    a data thesaurus for automating tasks of data management based on the mappings, wherein the data thesaurus translates business instructions for the information model into corresponding data processing instructions for the plurality of physical data assets, and wherein the data thesaurus translates the business instructions based on the mappings.

2. The enterprise information unification system of claim 1 wherein the information model is an ontology model and wherein the business constructs include ontology classes and properties of ontology classes.

3. The enterprise information unification system of claim 2 wherein the business constructs include ontology class inheritance relationships.

4. The enterprise information unification system of claim 1 wherein the business rules include user defined functions.

5. The enterprise information unification system of claim 1 wherein the business rules include look-up tables for relating values of a plurality of class properties.

6. The enterprise information unification system of claim 1 wherein the information modeler generates descriptors for the business constructs, wherein the descriptors are metadata used to catalog the data asset constructs.

7. The enterprise information unification system of claim 1 wherein the plurality of physical data assets include at least one relational database schema.

8. The enterprise information unification system of claim 1 wherein the plurality of physical data assets include at least one XML schema.

9. The enterprise information unification system of claim 1 further comprising a model navigator for interactively viewing the information model.

10. The enterprise information unification system of claim 1 further comprising a test instance exporter for exporting instances of business constructs into at least one XML document that is valid with respect to an XML schema for the information model.

11. The enterprise information unification system of claim 1 wherein the model validator comprises a test instance validator for validating instances of the business constructs against requirements of the information model.

12. The enterprise information unification system of claim 11 wherein the requirements of the information model include data type requirements.

13. The enterprise information unification system of claim 11 wherein the requirements of the information model include relationships among the business constructs.

14. The enterprise information unification system of claim 1 wherein the data rationalizer comprises a programming interface for generating the mappings from the plurality of physical data assets into the information model.

15. The enterprise information unification system of claim 1 wherein the data rationalizer generates the mappings based on a corresponding schema of each specific physical data asset in the plurality of physical data assets.

16. The enterprise information unification system of claim 1 wherein the data rationalizer generates mappings from the data asset constructs to corresponding business constructs.

17. The enterprise information unification system of claim 16 wherein the data rationalizer comprises a reverse modeler for automatically inferring at least a portion of the information model corresponding to the at least one physical data asset of the plurality of physical data assets, and for automatically generating mappings from the data asset constructs to corresponding business constructs.

18. The enterprise information unification system of claim 17 wherein the synchronizer describes to a user the updates to the at least one physical data asset of the plurality of physical data assets.

19. The enterprise information unification system of claim 18 wherein the synchronizer comprises an impact analyzer for determining the impact of the updates to the at least one physical data asset of the plurality of physical data assets on the mapping of the at least one physical data asset of the plurality of physical data assets into the information model.

20. The enterprise information unification system of claim 19 wherein the reverse modeler automatically updates the information model corresponding to the updates to the at least one physical data asset of the plurality of physical data assets.

21. The enterprise information unification system of claim 1 wherein said information modeler comprises a model importer for importing a logical data model.

22. The enterprise information unification system of claim 21 wherein the logical data model is an ontology model.

23. The enterprise information unification system of 21 wherein the logical data model is an entity-relationship diagram.

24. The enterprise information unification system of claim 1 wherein said information modeler comprises a model editor for editing the information model.

25. The enterprise information unification system of claim 24 further comprising an impact analyzer for determining an impact of a candidate modification to the information model on the business constructs and the mappings.

26. The enterprise information unification system of claim 24 wherein the impact analyzer determines an impact of a candidate modification to the plurality of physical data assets on the mappings.

27. The enterprise information unification system of claim 25 wherein said information modeler designates business constructs as being in an undefined state when said impact analyzer determines that such constructs are no longer well-defined, in response to a user performing the candidate modification to the information model.

28. The enterprise information unification system of claim 27 wherein said model editor further modifies the information model so as to repair at least one business construct designated as being in the undefined state, in response to which said information modeler no longer designates the at least one business construct as being in the undefined state.

29. The enterprise information unification system of claim 1 further comprising a publisher for exporting the information model to a presentation.

30. The enterprise information unification system of claim 29 wherein said publisher also exports the plurality of physical data assets to the presentation.

31. The enterprise information unification system of claim 30 wherein said publisher also exports the mappings from the plurality of physical data assets to the information model.

32. The enterprise information unification system of claim 31 wherein the presentation is a web presentation including linked HTML pages.

33. The enterprise information unification system of claim 32 wherein the linked HTML pages include informational pages corresponding to business constructs and information pages corresponding to data asset constructs, and wherein the linked HTML pages are linked in accordance with the mappings between the plurality of physical data assets and the information model.

34. The enterprise information unification system of claim 29 wherein the presentation is formatted in XML documents.

35. The enterprise information unification system of claim 1 further comprising an exporter for exporting the information model according to an industry standard format.

36. The enterprise information unification system of claim 35 wherein the exporter exports the information model in DAML+OIL format.

37. The enterprise information unification system of claim 35 wherein the exporter exports the information model in Resource Description Framework (RDF) format.

38. The enterprise information unification system of claim 1 wherein said information modeler comprises a query builder for generating queries on the information model.

39. The enterprise information unification system of claim 38 wherein said data thesaurus comprises a query generator for translating queries on the information model into corresponding queries on at least one of the plurality of physical data assets.

40. The enterprise information unification system of claim 1 wherein said data thesaurus comprises a transformation generator for generating transformation scripts to convert data from at least one of the plurality of physical data assets to at least one other of the plurality of physical data assets.

41. The enterprise information unification system of claim 1 wherein said data thesaurus comprises a data locator for identifying and locating data asset constructs that correspond to prescribed business constructs.

42. The enterprise information unification system of claim 41 wherein said data locator also identifies formats of the data asset constructs that correspond to the prescribed business constructs.

43. The enterprise information unification system of claim 41 further comprising a data access controller for associating at least one data access privilege with the data asset constructs that correspond to the prescribed business constructs, based on a data access policy associated with the information model.

44. The enterprise information unification system of claim 1 further comprising a transmitter for transmitting data processing instructions for the plurality of physical data assets to a query engine capable of querying across at least one physical data asset.

45. The enterprise information unification system of claim 1 further comprising a transmitter for transmitting data processing instructions for the plurality of physical data assets to an enterprise application integration system.

46. The enterprise information unification system of claim 45 wherein said transmitter transmits the data processing instructions just in time, as the enterprise application integration system encounters messages that require translation.

47. The enterprise information unification system of claim 45 further comprising an interface to the enterprise integration system that is a web service.

48. The enterprise information unification system of claim 45 wherein said transmitter transmits the data processing instructions for the plurality of physical data assets to a message broker for the enterprise application integration system.

49. The enterprise information unification system of claim 1 further comprising a transmitter for transmitting data processing instructions for the plurality of physical data assets to an extraction transformation and loading (ETL) system for a data warehousing system.

50. The enterprise information unification system of claim 1 further comprising a transmitter for transmitting data processing instructions for the plurality of physical data assets to a data cleansing system.

51. The enterprise information unification system of claim 1 further comprising a transmitter for transmitting data processing instructions for the plurality of physical data assets to a data mining system.

52. A method, implemented in a data processing system, for enterprise information unification, the method comprising:
a plurality of software instructions stored in a memory, the plurality of software instructions adapted to cause a processor of a computer to perform the steps of:
modeling business entities and their properties as an information model comprising business constructs, wherein the business constructs include business rules identifying relationships among class properties, wherein the information model is generated using a plurality of physical data assets as inputs, further comprising:
simulating the information model;
populating data that simulates actual enterprise data; and
validating a simulation of the information model;
generating mappings from the plurality of physical data assets to the information model, the plurality of physical data assets comprising data asset constructs, further comprising:
describing to which business constructs the data asset constructs relate; and
synchronizing updates to at least one physical data asset of the plurality of physical data assets with the information model; and
automating tasks of data management based on the mappings, further comprising:
translating business instructions for the information model into corresponding data processing instructions for the plurality of physical data assets, based on the mappings.

53. The method of claim 52 wherein the information model is an ontology model and wherein the business constructs include ontology classes and properties of ontology classes.

54. The method of claim 53 wherein the business constructs include ontology class inheritance relationships.

55. The method of claim 52 wherein the business rules include user defined functions.

56. The method of claim 52 wherein the business rules include lookup tables for relating a plurality of class properties.

57. The method of claim 52 wherein the step of modeling business entities and their properties comprises generating descriptors for the business constructs, wherein the descriptors are metadata used to catalog the data asset constructs.

58. The method of claim 52 wherein the plurality of physical data assets include at least one relational database.

59. The method of claim 52 wherein the plurality of physical data assets include at least one XML document.

60. The method of claim 52 further comprising interactively viewing the information model.

61. The method of claim 52 wherein said modeling business entities and their properties comprises exporting instances of business constructs into at least one XML document that is valid with respect to an XML schema for the information model.

62. The method of claim 52 wherein the validating step comprises validating instances of business constructs against requirements of the information model.

63. The method of claim 62 wherein the requirements of the information model include data type requirements.

64. The method of claim 62 wherein the requirements of the information model include relationships among business constructs.

65. The method of claim 52 wherein the step of generating mappings is performed using a programming interface.

66. The method of claim 52 wherein the step of generating mappings is based on a corresponding schema of each specific physical data asset in the plurality of physical data assets.

67. The method of claim 52 wherein the step of generating mappings generates mappings from the data asset constructs to corresponding business constructs.

68. The method of claim 67 wherein the step of generating mappings further comprises:

automatically inferring at least a portion of the information model corresponding to the at least one physical data asset of the plurality of physical data assets; and automatically generating mappings from the data asset constructs to corresponding business constructs.

69. The method of claim 68 wherein the step of synchronizing updates comprises describing to a user the updates to the at least one physical data asset of the plurality of physical data assets.

70. The method of claim 69 wherein the step of synchronizing updates comprises determining an impact of the updates to the at least one physical data asset of the plurality of physical data assets on the mapping of the at least one physical data asset of the plurality of physical data assets into the information model.

71. The method of claim 70 wherein the step of automatically inferring at least a portion of the information model comprises automatically updating the information model corresponding to the updates to the at least one physical data asset of the plurality of physical data assets.

72. The method of claim 52 wherein said modeling business entities and their properties comprises importing a logical data model.

73. The method of claim 72 wherein the logical data model is an ontology model.

74. The method of 72 wherein the logical data model is an entity relationship diagram.

75. The method of claim 52 wherein said modeling business entities and their properties comprises editing the information model.

76. The method of claim 75 further comprising determining an impact of a candidate modification to the information model on the business constructs and the mappings.

77. The method of claim 75 further comprising determining an impact of a candidate modification to the plurality of physical data assets on the mappings.

78. The method of claim 76 wherein, in response to a user performing the candidate modification to the information model, said modeling business entities and their properties further comprises designating business constructs as being in an undefined state when such constructs are no longer well-defined.

79. The method of claim 78 wherein said editing the information model comprises further modifying the information model so as to repair at least one business construct designated as being in the undefined state, in response to which the at least one business construct is no longer designated as being in the undefined state.

80. The method of claim 52 further comprising exporting the information model to a presentation.

81. The method of claim 80 further comprising exporting the plurality of physical data assets to the presentation.

82. The method of claim 81 further comprising exporting the mappings from the plurality of physical data assets to the information model.

83. The method of claim 82 wherein the presentation is a web presentation including linked HTML pages.

84. The method of claim 83 wherein the linked HTML pages include informational pages corresponding to business constructs and information pages corresponding to data asset constructs, and wherein the linked HTML pages are linked in accordance with the mappings between the plurality of physical data assets and the information model.

85. The method of claim 80 wherein the presentation is formatted in XML documents.

86. The method of claim 52 further comprising exporting the information model according to an industry standard format.

87. The method of claim 86 further comprising exporting the information model in DAML+OIL format.

88. The method of claim 86 further comprising exporting the information model in Resource Description Framework (RDF) format.

89. The method of claim 52 wherein said modeling business entities and their properties comprises generating queries on the information model.

90. The method of claim 89 wherein said automating tasks comprises translating queries on the information model into corresponding queries on at least one of the plurality of physical data assets.

91. The method of claim 52 wherein said automating tasks comprises generating transformation scripts to convert data from at least one of the plurality of physical data assets to at least one other of the plurality of physical data assets.

92. The method of claim 52 wherein said automating tasks comprises:
identifying data asset constructs that correspond to prescribed business constructs; and
locating the data asset constructs that correspond to the prescribed business constructs.

93. The method of claim 92 wherein said identifying data asset constructs comprises identifying formats of the data asset constructs that correspond to the prescribed business constructs.

94. The method of claim 92 further comprising associating at least one data access privilege with the data asset constructs that correspond to the prescribed business constructs, based on a data access policy associated with the information model.

95. The method of claim 52 further comprising transmitting the data processing instructions for the plurality of physical data assets to a query engine capable of querying across at least one physical data asset.

96. The method of claim 52 further comprising transmitting the data processing instructions for the plurality of physical data assets to an enterprise application integration system.

97. The method of claim 96 wherein said transmitting is performed just in time, as the enterprise application integration system encounters messages that require translation.

98. The method of claim 96 wherein said transmitting comprises transmitting the data processing instructions for the plurality of physical data assets to a message broker for the enterprise application integration system.

99. The method of claim 52 further comprising transmitting the data processing instructions for the plurality of physical data assets to an extraction transformation and loading (ETL) system for a data warehousing system.

100. The method of claim 52 further comprising transmitting the data processing instructions for the plurality of physical data assets to a data cleansing system.

101. The method of claim 52 further comprising transmitting the data processing instructions for the plurality of physical data assets to a data mining system.

102. A computer program product, in a computer readable storage medium, for enterprise information unification, the computer program product comprising:
a plurality of instructions stored in the computer readable storage medium, wherein the plurality of instructions are adapted to cause a processor of a computer to perform the steps of;
modeling business entities and their properties as an information model comprising business constructs, wherein the business constructs include business rules identifying relationships among class properties, wherein the information model is generated using a plurality of physical data assets as inputs, further comprising:
   simulating the information model;
   populating data that simulates actual enterprise data; and
   validating a simulation of the information model;
generating mappings from the plurality of physical data assets to the information model, the plurality of physical data assets comprising data asset constructs, further comprising:
   describing to which business constructs the data asset constructs relate; and
   synchronizing updates to at least one physical data asset of the plurality of physical data assets with the information model; and
automating tasks of data management based on the mappings, further comprising:
   translating business instructions for the information model into corresponding data processing instructions for the plurality of physical data assets, based on the mappings.

* * * * *